US 8,939,246 B2

(12) United States Patent
Yamaguchi et al.

(10) Patent No.: US 8,939,246 B2
(45) Date of Patent: Jan. 27, 2015

(54) AUTOMOTIVE FLOOR STRUCTURE

(75) Inventors: Toshiyuki Yamaguchi, Utsunomiya (JP); Shotaro Ayuzawa, Utsunomiya (JP); Shinya Kobayashi, Sakura (JP); Koichi Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 13/823,800

(22) PCT Filed: Sep. 15, 2011

(86) PCT No.: PCT/JP2011/005214
§ 371 (c)(1),
(2), (4) Date: May 21, 2013

(87) PCT Pub. No.: WO2012/063393
PCT Pub. Date: May 18, 2012

(65) Prior Publication Data
US 2013/0229030 A1   Sep. 5, 2013

(30) Foreign Application Priority Data

Nov. 10, 2010   (JP) .................................. 2010-252065
Nov. 10, 2010   (JP) .................................. 2010-252070
Nov. 10, 2010   (JP) .................................. 2010-252071

(51) Int. Cl.
*B60K 1/04*    (2006.01)
*B62D 25/20*   (2006.01)
(Continued)

(52) U.S. Cl.
CPC . *B62D 25/20* (2013.01); *B60K 1/04* (2013.01); *B62D 21/157* (2013.01); *B62D 25/025* (2013.01); *B62D 25/2036* (2013.01); *B60K 2001/0438* (2013.01)
USPC ........................................ 180/68.5; 180/311

(58) Field of Classification Search
CPC .. B60K 1/05; B60K 2001/0438; B62D 25/20; B62D 21/157
USPC ............. 180/68.5, 311; 280/784; 296/187.12, 296/193.07, 204, 203.03
See application file for complete search history.

(56) References Cited

U.S. PATENT DOCUMENTS 5,501,289 A * 3/1996 Nishikawa et al. .......... 180/68.5
5,921,618 A * 7/1999 Mori et al. ............... 296/187.12
6,085,854 A * 7/2000 Nishikawa ................... 180/68.5
(Continued)

FOREIGN PATENT DOCUMENTS

JP    6064452    3/1994
JP    6115362    4/1994
(Continued)

OTHER PUBLICATIONS

International Search Report, Dec. 20, 2011.

*Primary Examiner* — Frank Vanaman
(74) *Attorney, Agent, or Firm* — Rankin, Hill & Clark LLP

(57) ABSTRACT

To achieve efficient and proper transmission of an impact load from a floor frame on one side of a vehicle body to a floor frame on the other side to thereby protect a battery unit from damage, an automotive floor structure includes a first cross member upper and a first cross member lower. the first cross member upper extends in a lateral direction of the vehicle body and has ends attached to left and right end side sills, respectively. The first cross member lower extends in the lateral direction below a front floor panel at a position under the first cross member upper, and has ends secured to the left and right floor frames, respectively. The first cross member upper and the first cross member lower vertically sandwich the battery unit therebetween.

16 Claims, 15 Drawing Sheets

(51) Int. Cl.
*B62D 21/15* (2006.01)
*B62D 25/02* (2006.01)

(56) References Cited

U.S. PATENT DOCUMENTS

| | | | |
|---|---|---|---|
| 6,188,574 B1 * | 2/2001 | Anazawa | 361/695 |
| 7,500,714 B2 * | 3/2009 | Abe et al. | 296/193.07 |
| 2002/0145307 A1 * | 10/2002 | Fujita | 296/193 |
| 2004/0104602 A1 * | 6/2004 | Cardimen et al. | 296/204 |
| 2013/0118824 A1 * | 5/2013 | Maeda et al. | 180/68.5 |

FOREIGN PATENT DOCUMENTS

| | | |
|---|---|---|
| JP | 7081624 | 3/1995 |
| JP | 7156826 | 6/1995 |
| JP | 8175419 | 7/1996 |
| JP | 2891072 | 5/1999 |
| JP | 3070353 | 7/2000 |
| JP | 3132261 | 2/2001 |
| JP | 2006182295 | 7/2006 |
| JP | 2008174181 | 7/2008 |
| JP | 2009083600 | 4/2009 |

* cited by examiner

//AUTOMOTIVE FLOOR STRUCTURE

TECHNICAL FIELD

The present invention relates to an automotive floor structure, and particularly to a floor structure of an automobile, such as an electronic car, in which a large battery unit is mounted below the floor.

BACKGROUND ART

An automobile having a large battery unit mounted therein, such as an electronic car, may have a floor structure including a pair of side sills extending in a fore-and-aft direction on either side of a vehicle body, a front floor panel extending between the side sills, a pair of floor frames (side members) extending in the fore-and-aft direction at positions spaced inward from the two side sills, respectively, in a lateral direction of the vehicle body, and a cross member extending in the lateral direction over the front floor panel (on the cabin side) and having ends attached to the two floor frames, respectively, wherein a battery unit is disposed flatly below the front floor panel between the two floor frames or on the inner side of the two floor frames in the lateral direction.

In the automobiles having such a battery unit arrangement, for the purpose of protecting the battery unit from damage in case of a side collision, an outrigger may be disposed between the side sill and the floor frame on each side of the vehicle body so that the outrigger collapses to absorb impact energy at the time of a side collision (see patent document 1, for example) or a reinforcement member (brace) may be attached to each floor frame to prevent inward tilting of the floor frame at the time of a side collision (see patent document 2, for example).

Further, in the portion where the front floor panel is provided, a cross member may be disposed so as to extend in the lateral direction of the vehicle body and be attached to the side sills or to the floor frames on either side of the vehicle body, such that the cross member transmits a side impact load from the floor frame on one side of the vehicle body to the floor frame on the other side (see patent documents 1, 2 and 3, for example).

PRIOR ART DOCUMENT(S)

Patent Document(s)

Patent Document 1: JP 2891072B2
Patent Document 2: JP 3132261B2
Patent Document 3: JP 3070353B2

BRIEF SUMMARY OF THE INVENTION

Task to be Accomplished by the Invention

However, in the conventional structure, the transmission of the side impact load in the lateral direction of the vehicle body after the outrigger has collapsed is performed only by an upper cross member. Therefore, the side impact load may not be transmitted sufficiently from the floor frame on one side of the vehicle body to the floor frame on the other side and the cross member may be deformed, which may result in unsatisfactory protection of the battery unit from damage.

Further, in the conventional structure, it is necessary to increase the strength and rigidity of the cross member to achieve sufficient transmission of the side impact load by the cross member and thereby to protect the battery unit. For this reason, in the conventional structure, it is required to increase the wall thickness and/or the cross-sectional size of the cross member, and this tends to result in an increase in size and/or weight of the vehicle body. In particular, an increase in size of the cross member disposed on the cabin side can reduce the passenger space in the vehicle cabin.

The task to be accomplished by the present invention is to achieve efficient and proper transmission of an impact load from a floor frame on one side of a vehicle body to a floor frame on the other side to thereby protect a battery unit from damage. A further object of the present invention is to reduce a cross-sectional size of a cross member disposed on a cabin side while ensuring sufficient strength and rigidity of the cross member to protect the battery unit, thereby to enable a compact vehicle body design with a reduced weight but with an increased passenger space in a vehicle cabin.

Means to Accomplish the Task

An automotive floor structure according to the present invention comprises: a pair of side sills (10) extending in a fore-and-aft direction on either side of a vehicle body; a front floor panel (12) extending between the two side sills (10); and a pair of floor frames (14) extending in the fore-and-aft direction below the front floor panel (12) at positions spaced inward from the two side sills (10), respectively, in a lateral direction of the vehicle body, such that a battery unit (50) is disposed between the two floor frames (14) below the front floor panel (12), the automotive floor structure further comprising: a first cross member upper (22) extending in the lateral direction and having ends attached to the two side sills (10), respectively; and a first cross member lower (24) extending in the lateral direction below the front floor panel (12) at a position under the first cross member upper (22), and having ends secured to the two floor frames (14), respectively, wherein the first cross member upper (22) and the first cross member lower (24) vertically sandwich the battery unit (50) therebetween.

According to this structure, a side impact load input to one floor flame (14) is split into a part conveyed by the first cross member upper (22) and a part conveyed by the first cross member lower (24), and via these cross members, transmitted from the one floor frame (14) to the other floor frame (14). Thus, the burden of load transmission on each of the first cross member upper (22) and the first cross member lower (24) is reduced, and the transmission of load in the lateral direction of the vehicle body is performed efficiently and favorably. This makes it possible to reduce the size of the first cross member upper (22) as compared to a conventional one.

In the automotive floor structure according to the present invention, preferably, the first cross member upper (22) and the first cross member lower (24) are disposed at a same position in the fore-and-aft direction, and the automotive floor structure further comprises a first outrigger (32) disposed between the side sill (10) and the floor frame (14) on each side of the vehicle body at a same position as the first cross member upper (22) and the first cross member lower (24) in the fore-and-aft direction, each first outrigger (32) being attached to the corresponding side sill (10) and floor frame (14) and configured to collapse upon receipt of side impact energy.

According to this structure, since the first outrigger (32) subjected to side impact energy collapses, absorption of the side impact energy takes place between the corresponding side sill (10) and floor frame (14). Therefore, the floor frames (14) are prevented from being deformed at the time of a side collision. Further, transmission of the side impact load from the side sill (10) to the floor frame (14) via the first outrigger (32) and to each of the first cross member upper (22) and the first cross member lower (24) is performed linearly in a favorable manner, and this makes the floor frames (14) even less prone to be deformed. These contribute to protection of the battery unit (50) disposed between the floor frames (14).

In the automotive floor structure according to the present invention, preferably, a portion of each first outrigger (32) attached to the corresponding side sill (10) coincides with a height of a side wall of the side sill (10), and a portion of each first outrigger (32) attached to the corresponding floor frame (14) coincides with a height of a side wall of the floor frame (14).

According to this structure, each first outrigger (32) receives a side collision load from the entire vertical expanse of the side wall of the corresponding side sill (10) while the other side of the first outrigger (32) is supported by the side wall of the corresponding floor frame (14) over the entire vertical expanse thereof, and therefore, the entire part of the first outrigger (32) can effectively collapse, thereby increasing an amount of impact energy that can be absorbed by the first outrigger (32) between the corresponding side sill (10) and floor frame (14). As a result, deformation of the floor frames (14) can be prevented effectively.

In the automotive floor structure according to the present invention, preferably, a portion (22A, 22E) of the first cross member upper (22) extending between the side sill (10) and the floor frame (14) on each side of the vehicle body has a strength lower than that of a portion (22B, 22C, 22D) of the first cross member upper (22) extending between the floor frames (14) in the lateral direction.

According to this structure, since the portion (22A, 22E) of the first cross member upper (22) extending between the side sill (10) and the floor frame (14) on each side of the vehicle body has a strength lower than that of the portion (22B, 22C, 22D) of the first cross member upper (22) extending between the floor frames (14) in the lateral direction of the vehicle body, the portion (22A, 22E) extending between the side sill (10) and the floor frame (14) serves as an impact energy absorption member (crushable member) which collapses upon receipt of a side impact load. As a result, absorption of side impact energy takes place between the side sill (10) and the floor frame (14), and deformation of the floor frame (14) by the side collision can be avoided. Further, by adjusting the strength of the portion (22A, 22E) of the first cross member upper (22) extending between the side sill (10) and the floor frame (14), it is possible to control a ratio between the side impact load input to the first cross member upper (22) and the side impact load input to the first cross member lower (24).

In the automotive floor structure according to the present invention, preferably, the first cross member lower (24) comprises: a pair of bracket members (24E) fixed to undersides of the two floor frames (14), respectively, and extending downward from the undersides; and a cross member main body (25) extending between the two bracket members (24E) in the lateral direction and attached to a lower end of each bracket member (24E), wherein each bracket member (24E) is of a hollow box-like shape, and a collar member (24F) through which a mounting bolt (30) is passed is fixedly disposed inside each bracket member (24E).

According to this structure, the strength and rigidity of each bracket member (24E) are improved, particularly in the vertical direction, and the first cross member lower (24) is enabled to transmit a larger side impact load.

In the automotive floor structure according to the present invention, preferably, each floor frame (14) includes a groove-shaped cross section, and a support member (26) is attached to an inner side of the groove, the support member (26) supporting an upper part of a collar nut member (28) for engagement with a bolt to secure the corresponding bracket member (24E) to the floor frame (14).

According to this structure, the collar nut members (28) can be mounted to the floor frame (14) with improved mounting strength, and each support member (26) can serve as a reinforcement member for the corresponding floor frame (14) to improve the strength of the floor frame (14) at the part where the first cross member lower (24) is attached, whereby achieving a structure that is robust against a side collision.

In the automotive floor structure according to the present invention, preferably, the cross member main body (25) is formed by a lower member (24A) and an upper member (24C) attached to each other to have a closed cross section.

According to this structure, the rigidity of the cross member main body (25) is improved, and the first cross member lower (24) is enabled to transmit a larger side impact load.

In the automotive floor structure according to the present invention, preferably, the first cross member lower (24) is removably secured to the floor frames (14), and the battery unit is secured to the first cross member lower (24).

According to this structure, mounting/removal of the battery unit (50) for replacement can be readily achieved from under the front floor panel (12) together with the first cross member lower (24) by mounting/removing the first cross member lower (24) to/from the floor frames (14).

Preferably, the automotive floor structure according to the present invention further comprises: a second cross member (34) extending in the lateral direction below the front floor panel (12) at a position spaced rearward from the first cross member lower (24), having ends attached to the two floor frames (12), respectively, and having a shape including a groove-shaped cross-sectional portion; a nut support member (36) extending over an entire length of the second cross member (34) and attached to an inner side of the groove-shaped cross-sectional portion, the nut support member (36) having an upper surface portion (36A) spaced apart upward from a groove bottom (34A) of the second cross member (34) by a predetermined distance and extending in parallel with the groove bottom (34A); and a plurality of collar nut members (38) each extending between the groove bottom (34A) of the second cross member (34) and the upper surface portion (36A) of the nut support member (36), the collar nut members (38) being spaced apart from one another at predetermined intervals in the lateral direction and fixed to the upper surface portion (36A) of the nut support member (36), wherein the battery unit (50) is removably secured below the front floor panel (12) by means of mounting bolts (66) threadably engaged with the collar nut members (38).

According to this structure, the nut support member (36) not only supports the collar nut members (38) but also serves as a reinforcement member for the second cross member (34), and thus, the second cross member (34) can have a reduced cross section while maintaining sufficient strength and rigidity to protect the battery unit (50). This enables a compact vehicle body design with a reduced weight. Further, since the supporting strength of the collar nut members (38) is increased, the supporting strength of the battery (50) also is increased.

In the automotive floor structure according to the present invention, preferably, the second cross member (34) extends straight without including a stepped portion between the floor frames (14).

According to this structure, transmission of a side impact load between the floor frames (14) via the second cross member (34) can be performed favorably without a bending moment being created in the second cross member (34). This enables the second cross member (34) to have a smaller size.

In the automotive floor structure according to the present invention, preferably, the upper surface portion (36A) of the nut support member (36) is positioned at a same height as a middle part of the side sill (10) as seen in a cross section thereof or a part adjacent to the middle part.

According to this structure, the second cross member (34) reinforced by the top surface portion (36A) of the nut support member (36) can receive a side impact load without causing tilting of the side sill (10), and transmission of the side impact load by the second cross member (34) can be performed efficiently and favorably.

In the automotive floor structure according to the present invention, preferably, a second outrigger (40) is disposed between the side sill (10) and the floor frame (14) on each side of the vehicle body at a same position as the second cross member in the fore-and-aft direction, each second outrigger (40) being attached to the corresponding side sill (10) and floor frame (14) and configured to collapse upon receipt of side impact energy.

According to this structure, since the second outrigger (40) subjected to side impact energy collapses, absorption of the side impact energy takes place between the corresponding side sill (10) and floor frame (14). Therefore, the floor frames (14) are prevented from being deformed at the time of a side collision, and the battery unit (50) disposed between the floor frames (14) can be protected. Further, transmission of a side impact load from the side sill (10) to the floor frame (14) via the second outrigger (40) and to the second cross member (34) is performed linearly in a favorable manner, and this makes the floor frames (14) even less prone to be deformed, and thus, contributes to protection of the battery unit (50) disposed between the floor frames (14).

In the automotive floor structure according to the present invention, preferably, a portion of each second outrigger (40) attached to the corresponding side sill (10) coincides with a height of a side wall of the side sill (10), and a portion of each second outrigger (40) attached to the corresponding floor frame (14) coincides with a height of a side wall of the floor frame (14).

According to this structure, each second outrigger (40) receives a side collision load from the entire vertical expanse of the side wall of the corresponding side sill (10) while the other side of the second outrigger (40) is supported by the side wall of the corresponding floor frame (14) over the entire vertical expanse thereof, and therefore, the entire part of the second outrigger (40) can effectively collapse, thereby increasing an amount of impact energy that can be absorbed by the second outrigger (40) between the corresponding side sill (10) and floor frame (14). This also contributes to preventing deformation of the floor frames (14) effectively.

In the automotive floor structure according to the present invention, preferably, each floor frame (14) includes a groove-shaped cross section and a plate-shaped bulkhead member (42) is attached to an inner side of each floor frame (14) at a same position as the second cross member (34) in the fore-and-aft direction, the bulkhead member (42) extending so as to fill the groove-shaped cross section of the floor frame (14).

According to this structure, owing to the provision of the bulkhead member (42), the strength and rigidity of the part of each floor frame (14) to which the second cross member (34) is attached are improved effectively, and the transmission of a side impact load from either of the floor frames (14) to the second cross member (34) can be performed favorably.

In the automotive floor structure according to the present invention, preferably, the battery unit (50) comprises a battery frame (54) at a bottom thereof, and collar members (64) through which the mounting bolts (66) are passed are attached to the battery frame (54), each collar member (64) having an end abutting the second cross member (34).

According to this structure, the battery unit (50) can be supported with improved strength by robust screw fastening.

In the automotive floor structure according to the present invention, preferably, the front floor panel (12) comprises: a panel main portion (12A); a tunnel portion (12B) that is elevated from the panel main portion (12A) and extends in the fore-and-aft direction at a central portion in the lateral direction; and a pair of recessed portions (12C) which are provided on left and right sides of the tunnel portion (12B), respectively, in front of the first cross member upper (22) and are depressed downward relative to the panel main portion (12A), wherein the battery unit (50) is disposed on a rear side of the recessed portions (12C).

According to this structure, even though the battery unit (50) is disposed below the vehicle floor, recessed portions (12C) can be provided, and these recessed portions (12C) each provide a foot resting space for a passenger in the front seat (FS), thereby allowing the passenger to sit comfortably in the front seat (FS) while keeping the front seat (FS) from being disposed at an inconveniently high position which would sacrifice the easiness in getting in and out of the vehicle.

In the automotive floor structure according to the present invention, preferably, the front floor panel (12) is provided with a pair of sloped portions (12F) located over the two floor frames (14), respectively, on a rear side of the first cross member upper (22), each sloped portion (12F) defining fold ridge lines (a, b) extending in a direction of extension of the floor frames (14).

According to this structure, each floor frame (14) collaborates with the front floor panel (12) to form a polygonal, box-shaped cross section including the fold ridge lines (a, b), and this improves the rigidity of each floor frame (14) in the fore-and-aft direction of the vehicle body.

Effect of the Invention

In the automotive floor structure according to the present invention, a side impact load input to one floor flame is split into a part conveyed by the first cross member upper and a part conveyed by the first cross member lower, and via these cross members, transmitted from the one floor frame to the other floor frame, and therefore, the burden of load transmission on each of the first cross member upper and the first cross member lower is reduced, and the transmission of load in the lateral direction of the vehicle body is performed efficiently and favorably. This makes it possible to reduce the size of the first cross member upper as compared to a conventional one, and enables a compact vehicle body design with a reduced weight but with an increased passenger space in a vehicle cabin.

PREFERRED EMBODIMENT OF THE INVENTION

Now, an embodiment of an automotive floor structure according to the present invention will be described with reference to FIGS. 1 to 15. In the following description, it is assumed that "attachment" is achieved by welding such as spot welding so long as it is not indicated otherwise. Further, a "hat-shaped cross section" refers to a lateral cross section of a member having a groove-shaped cross-sectional portion with a flange piece (welding margin) projecting outward from each side of the groove-shaped cross-sectional portion.

Figure 1:
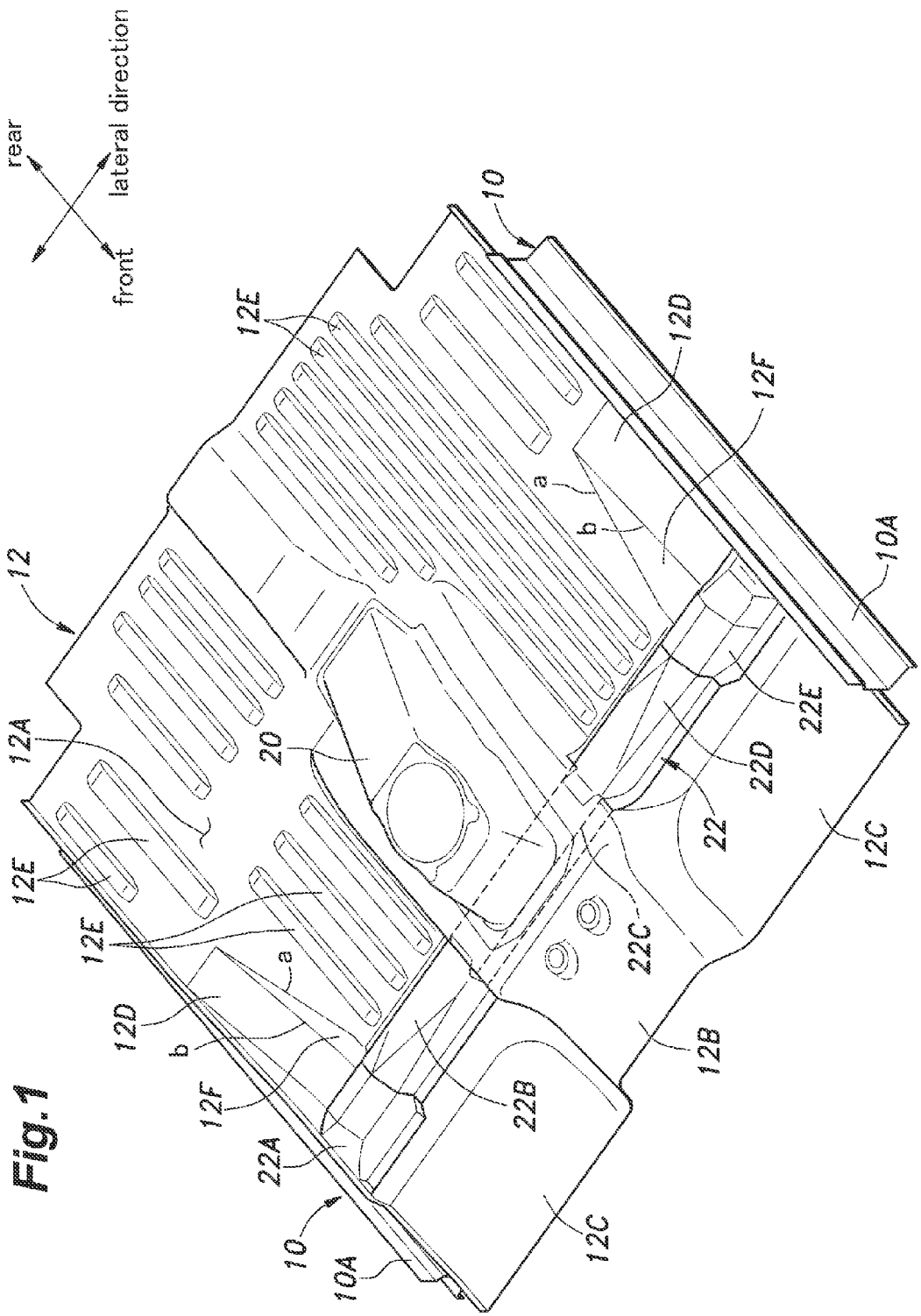
FIG. 1 is an upper perspective view showing an embodiment of an automotive floor structure according to the present invention.
Figure 2:
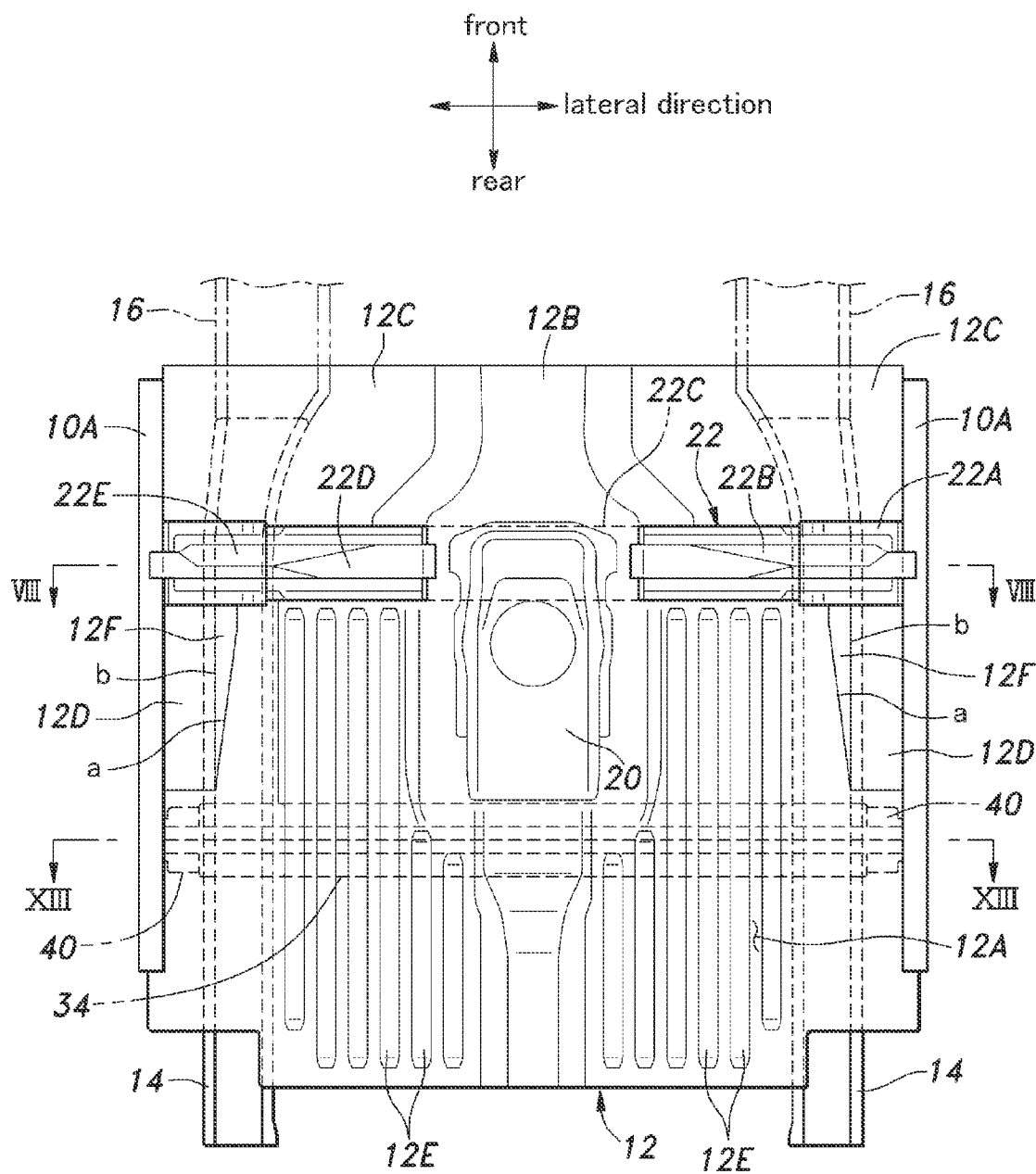
FIG. 2 is a plan view of the automotive floor structure according to the embodiment.
Figure 3:
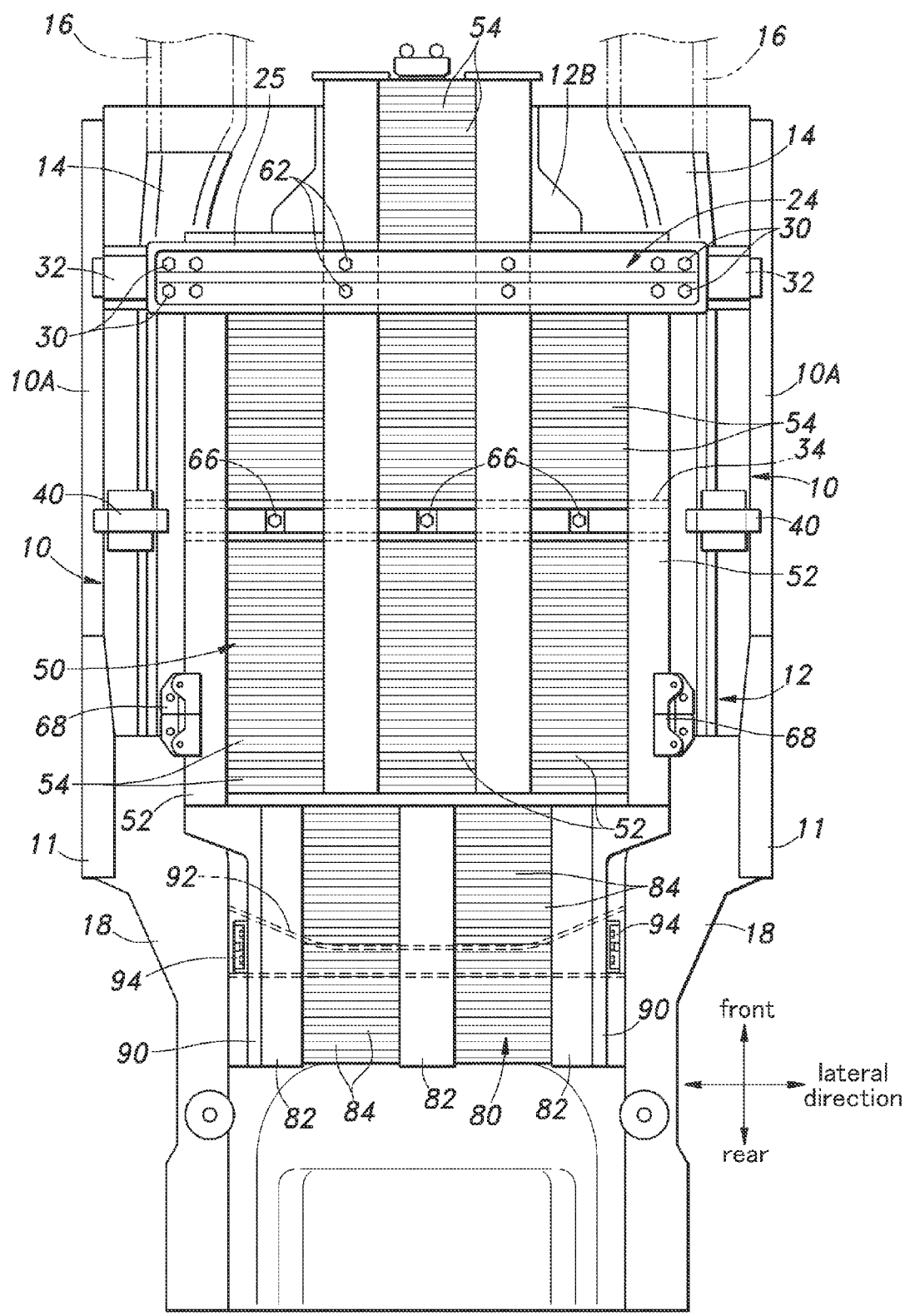
FIG. 3 is a bottom view of the automotive floor structure according to the embodiment.

As shown in FIGS. 1 to 3, the floor structure includes a pair of side sills 10 extending in parallel with each other in a fore-and-aft direction on either side of a vehicle body. Each side sill 10 includes an inner member 10A and an outer member 10B each made of a high tensile steel sheet (high strength steel sheet) and provided with a hat-shaped cross section, where the inner member 10A and the outer member 10B are attached to form a closed cross section (see FIGS. 8 and 9). A pair of side sill extension members 11 are attached to rear ends of the pair of side sills 10, respectively, and connect the pair of side sills 10 to a pair of rear side frames 18 on either side of the vehicle body (see FIG. 3).

A front floor panel 12 extends between the side sills 10, and has a pair of lateral edge portions attached to the corresponding inner members 10A.

A pair of floor frames 14 are disposed below the front floor panel 12 (below the vehicle exterior floor) at positions spaced inward from the two side sills 10, respectively, in the lateral direction, and extend substantially in parallel with the side sills 10 in the fore-and-aft direction. Each floor frame 14 has a hat-shaped cross section, and is attached to an under surface of the front floor panel 12 (vehicle exterior surface) such that the floor frame 14 forms a closed cross section jointly with the front floor panel 12.

To front ends of the floor frames 14 are attached rear ends of a pair of front side frames 16, respectively, where each front side frame 16 extends in the fore-and-aft direction (see FIGS. 2 and 3). The rear end of each of the side sill 10 and the floor frame 14 extending in the fore-and-aft direction on each side of the vehicle body is attached to the front end of the rear side frame 18 extending in the fore-and-aft direction on the same side (see FIG. 3).

The floor frames 14, front side frames 16 and rear side frames 18 jointly form a vehicle frame, serve as a main path through which an impact load is transmitted in the fore-and-aft direction, and are each made of a high tensile steel sheet.

It is to be noted that since each floor frame 14 extends straight and has a constant hat-shaped cross section throughout the entire length thereof, it can transmit an impact load in the fore-and-aft direction favorably without a bending moment created therein. Further, one or more patch members made of a normal steel sheet may be attached to each floor frame 14 to conform to an elevated portion(s) and/or a recessed portion(s) of the front floor panel 12 so that the floor frame 14 forms a closed cross section jointly with the front floor panel 12 throughout its entire length.

The front floor panel 12 is fabricated by press forming a steel sheet, and includes a panel main portion 12A which is substantially flat, a tunnel portion 12B which is elevated upward from the panel main portion 12A and extends in the fore-and-aft direction at a central portion in the lateral direction, a pair of recessed portions 12C which are disposed on left and right sides of a frontal part of the tunnel portion 12B, respectively, and are depressed downward relative to the panel main portion 12A, and a pair of sloped portions 12D formed in the lateral edge portions (edge portions attached to the inner members 10A) on either side of the vehicle body such that each sloped portion 12D has a predetermined width and is slanted downward toward the corresponding recessed portion 12C.

The panel main portion 12A has beads 12E formed therein by press forming, such that each bead 12E extends in the fore-and-aft direction of the vehicle body. An upper tunnel member 20 having an inverted fray-like shape is attached to the top of the tunnel portion 12B.

Each of the pair of recessed portions 12C is positioned in front of a first cross member upper 22, which will be described later, and provides a foot resting space for a passenger in a front seat. It is to be noted that the panel main portion 12A forms an elevated floor part relative to the floor height of the recessed portions 12C.

Figure 8:
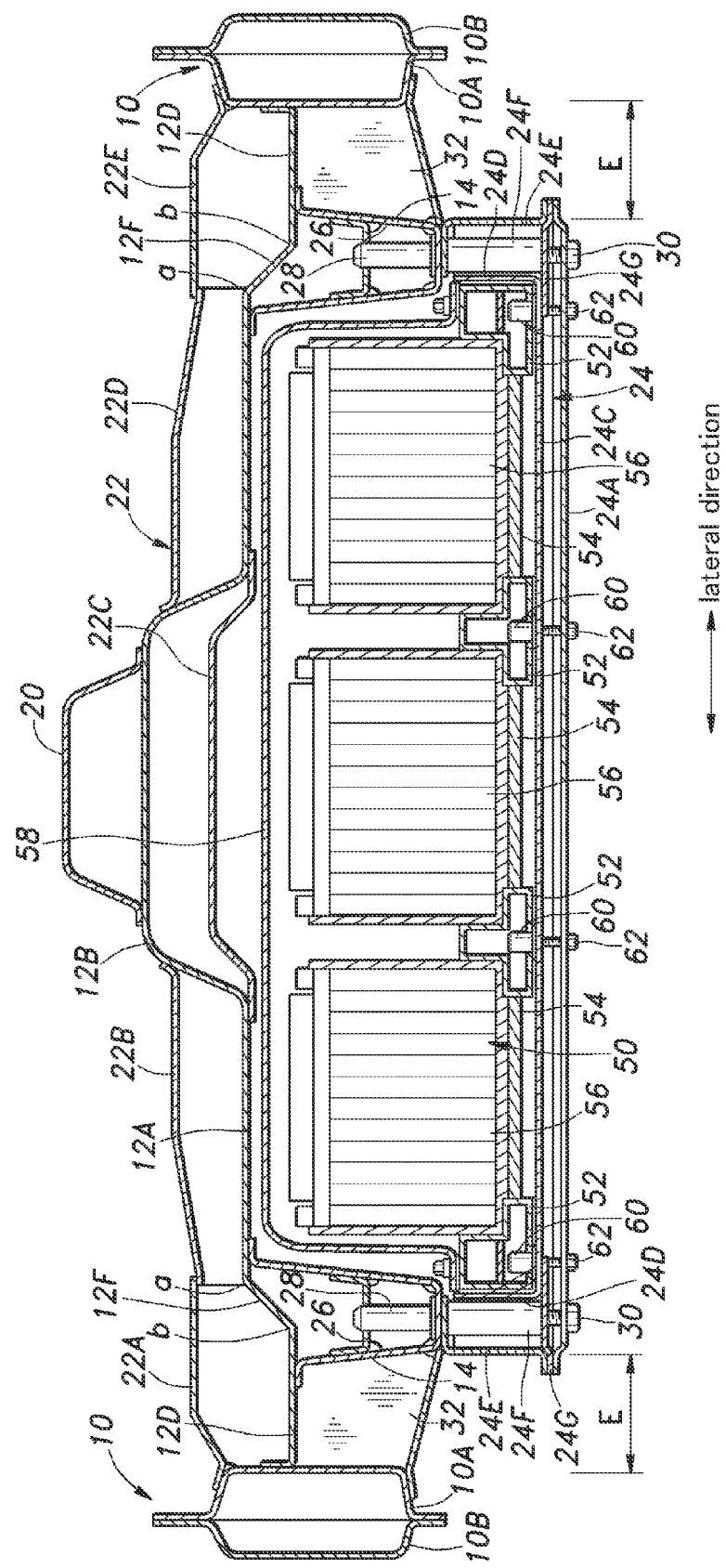
FIG. 8 is a cross-sectional view taken along line VIII-VIII in FIG. 2.
Figure 9:
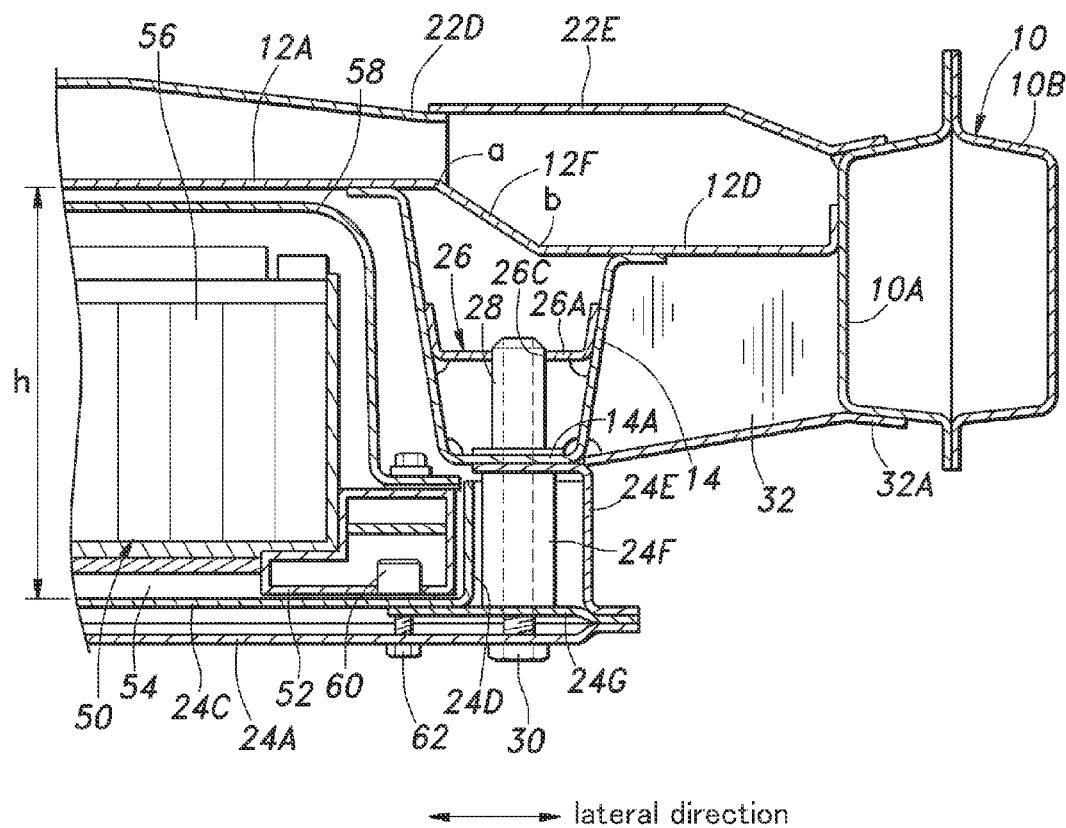
FIG. 9 is an enlarged fragmentary cross-sectional view taken along line VIII-VIII in FIG. 2.

Each of the pair of sloped portions 12D is positioned on a rear side of the later-described upper first cross member 22, and a side surface on the inner side of each sloped portion 12D in the lateral direction forms a sloped side surface 12F which is inclined in the lateral direction such that, as shown in FIGS. 2, 8 and 9, two fold ridge lines a and b extending in the fore-and-aft direction are formed at positions overlapping the corresponding floor frame 14 in the lateral direction.

In this arrangement, each floor frame 14 collaborates with the front floor panel 12 to form a polygonal, box-shaped cross section including the fold ridge lines a and b. This box-shaped cross section improves the rigidity of each floor frame 14 in the fore-and-aft direction of the vehicle body (bending rigidity). Therefore, transmission of an impact load in the foreand-aft direction can be performed favorably without bending deformation created in the floor frames 14, and a floor structure (vehicle body) that is robust against front and rear collisions can be achieved.

As shown in FIGS. 1, 2 and 8, the first cross member upper 22 is formed by a right end member 22A, a right side member 22B, an in-tunnel center member 22C, a left side member 22D, and a left end member 22E, which are arranged in a straight line and attached together. The first cross member upper 22 extends in the lateral direction at a foremost part of the panel main portion 12A, and the right end member 22A and the left end member 22E forming the end portions of the first cross member upper 22 are respectively attached to the inner members 10A of the side sills 10 on the corresponding sides.

Figure 10:
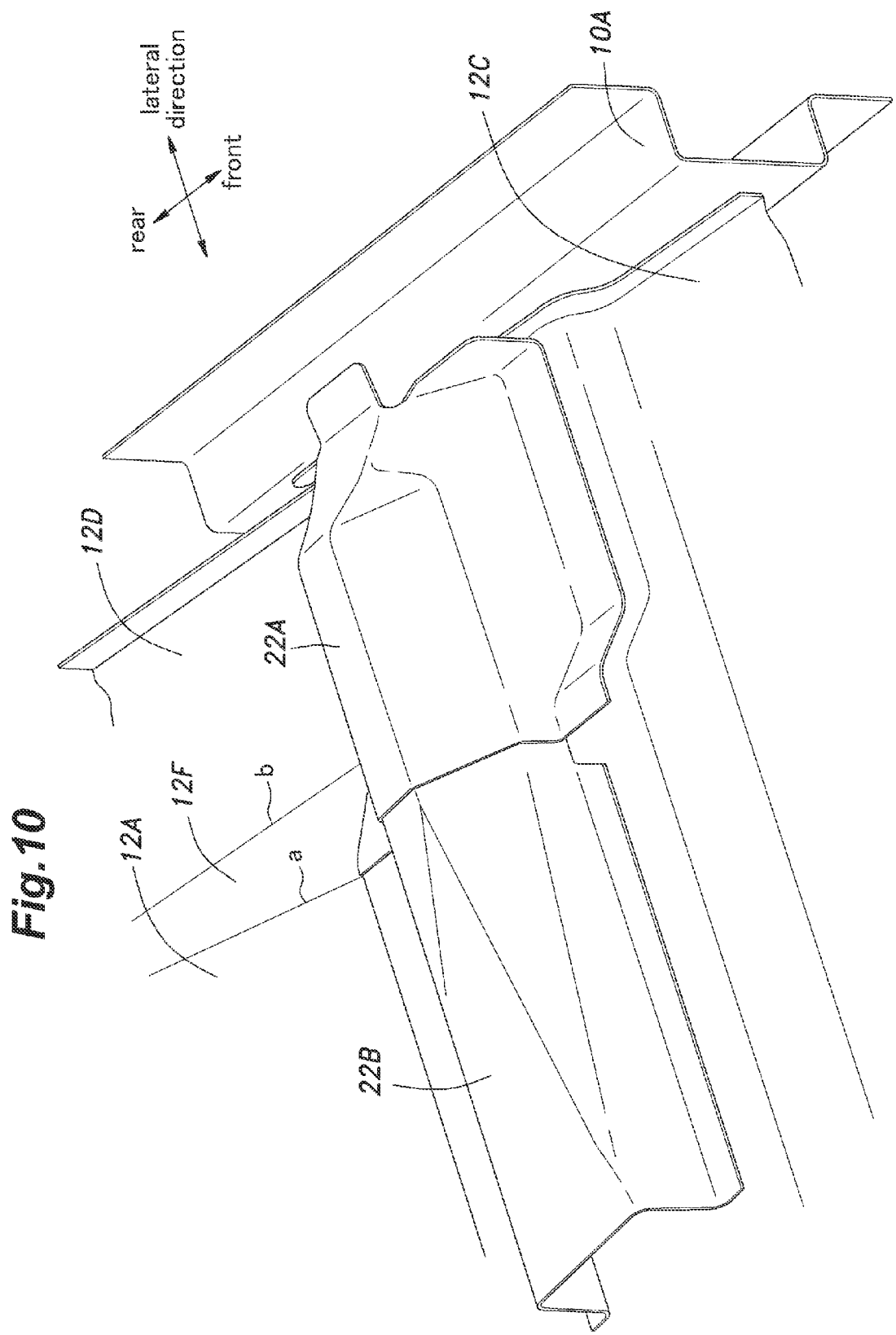
FIG. 10 is an enlarged fragmentary perspective view of a first cross member upper of the automotive floor structure according to the embodiment.

As shown in FIGS. 9 and 10, each of the right end member 22A and the left end member 22E has a hat-shaped cross section, has a length sufficient to connect the inner member 10A of the side sill 10 to the floor frame 14 on the corresponding side of the vehicle body, and is attached to the front floor panel 12, the inner member 10A of the side sill 10, and the floor frame 14 to form a closed cross section on the top side of the front floor panel 12.

As shown in FIGS. 1, 2 and 8, the right side member 22B extends in the lateral direction between the right end member 22A and the right outer surface of the tunnel portion 12B over the panel main portion 12A, and is attached to the front floor panel 12, the right end member 22A and the right outer surface of the tunnel portion 12B to form a closed cross section on the top side of the front floor panel 12. As shown in FIGS. 1, 2 and 8, the left side member 22D extends in the lateral direction between the left end member 22E and the left outer surface of the tunnel portion 12B over the panel main portion 12A, and is attached to the front floor panel 12, the left end member 22E and the left outer surface of the tunnel portion 12B to form a closed cross section on the top side of the front floor panel 12.

Figure 4:
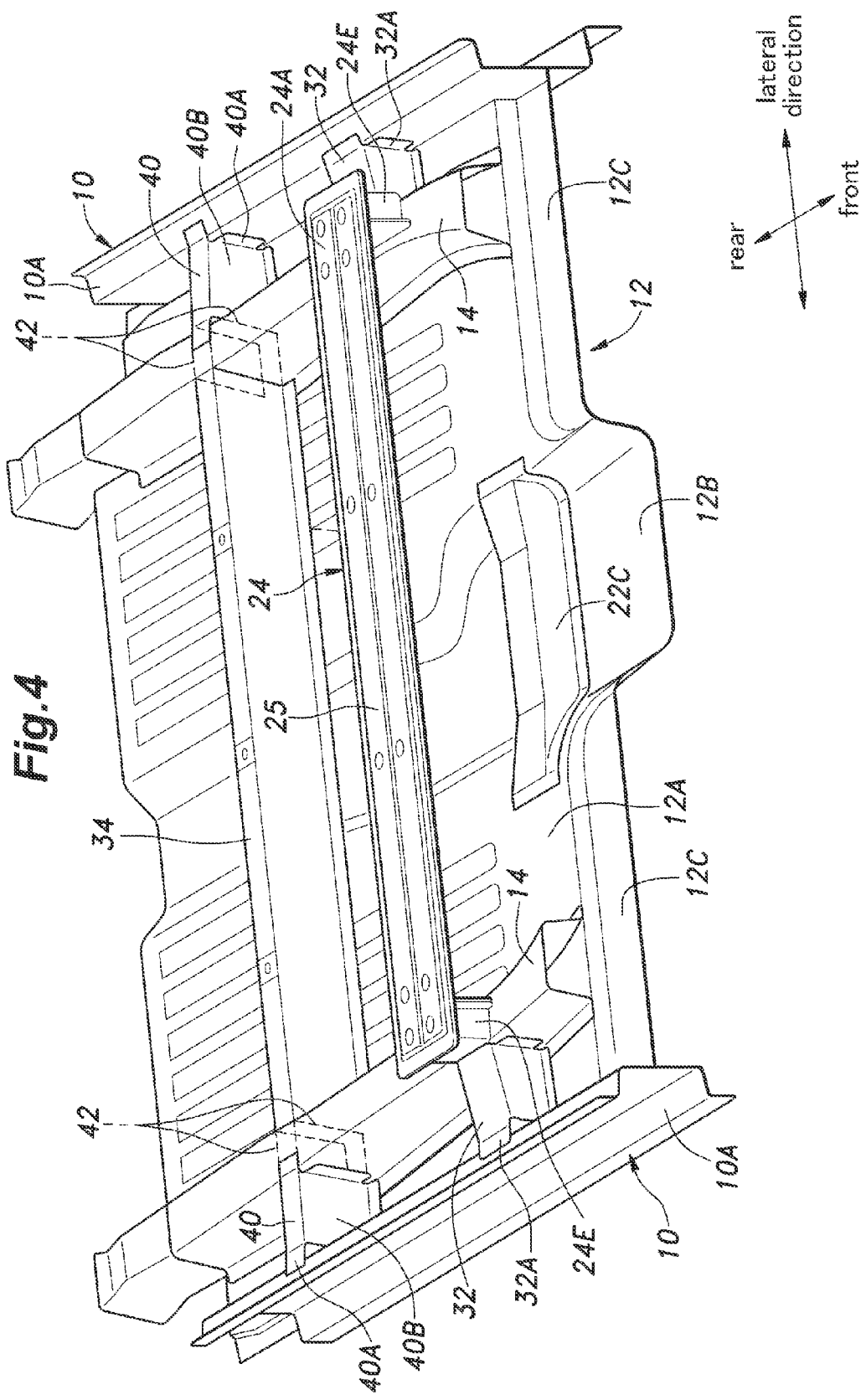
FIG. 4 is a perspective view of the automotive floor structure according to the embodiment showing a front floor panel as viewed from the underside, with a battery unit being removed.

As shown in FIGS. 4 and 8, the in-tunnel center member 22C has a hat-shaped cross section, extends in the lateral direction between the left and right inner surfaces of the tunnel portion 12B within the tunnel portion 12B, and is attached to the inner surfaces of the tunnel portion 12B to form a closed cross section on the underside of the front floor panel 12 (within the tunnel 12B).

The right end member 22A and the left end member 22E are configured to have lower strength and rigidity (i.e., easy to deform) as compared to the right side member 22B, the in-tunnel center member 22C and the left side member 22D. Namely, the right end member 22A and the left end member 22E are configured to serve as impact energy absorption members (crushable members), which will collapse upon receipt of an impact load. On the other hand, the right side member 22B, the in-tunnel center member 22C and the left side member 22D are designed to have such strength and rigidity that they are not deformed easily when subjected to a side impact load.

Such setting of the strength and rigidity of the members jointly forming the first cross member upper 22 can be made by appropriately selecting the shape, sheet thickness, material, and so on of each member. For example, the right end member 22A and the left end member 22E may be made of a normal steel sheet, while the right side member 22B, the in-tunnel center member 22C and the left side member 22D may be made of a high tensile steel sheet.

As shown in FIGS. 3, 4, 7 and 8, a first cross member lower 24 is provided below the front floor panel 12 (below the vehicle external floor) and extends in the lateral direction at a position under the first cross member upper 22 (at a position directly below the first cross member upper 22). The first cross member lower 24 has lateral ends attached to the two floor frames 14, respectively.

Figure 5:
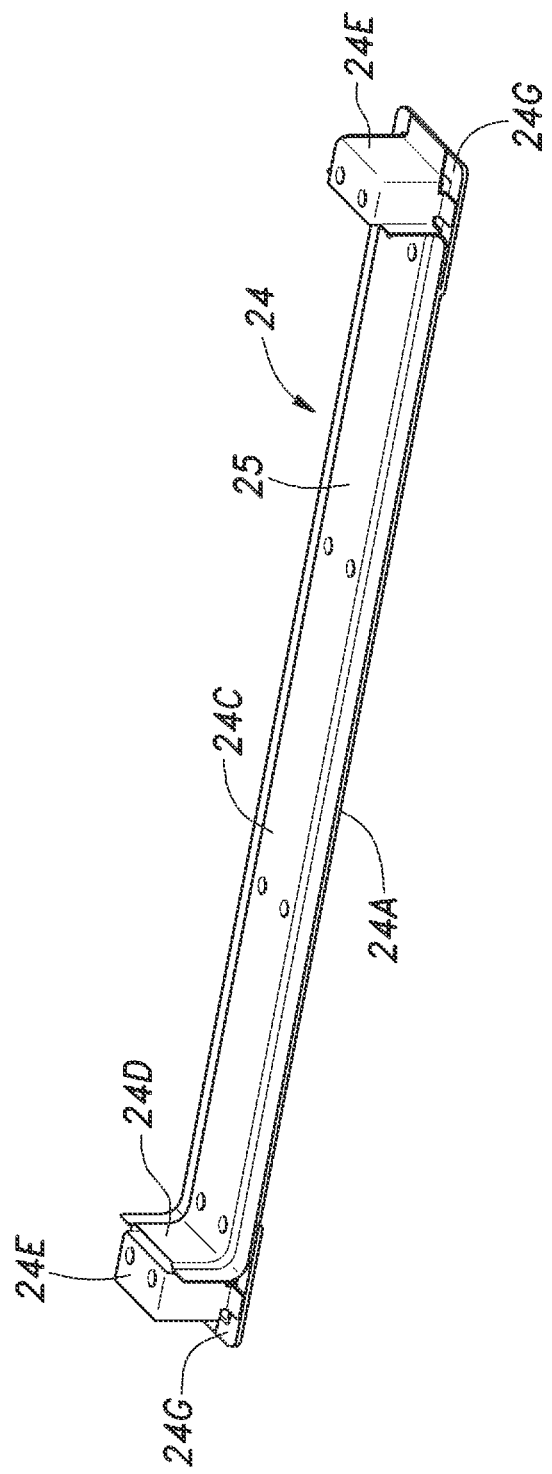
FIG. 5 is a perspective view of a first cross member lower used in the automotive floor structure according to the embodiment.
Figure 6:
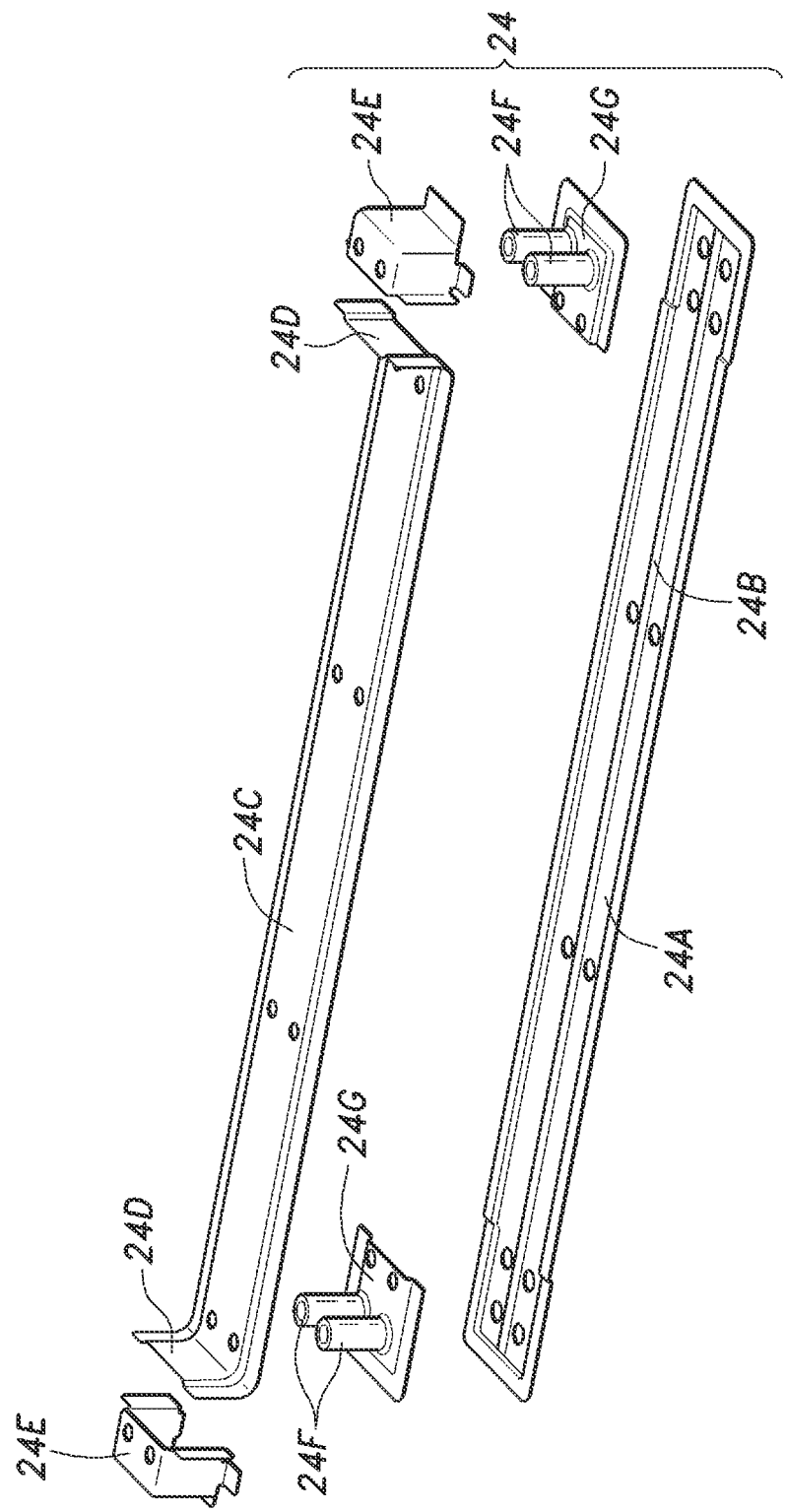
FIG. 6 is an exploded perspective view of the first cross member lower used in the automotive floor structure according to the embodiment.

As shown in FIGS. 5 and 6, the first cross member lower 24 is provided as an assembly of a lower member 24A having an elongated rectangular shape and provided with a bead 24B formed therein, an upper member 24C having an elongated rectangular shape and provided with upright bent pieces 24D at either end thereof, a pair of bracket members 24E provided on either end of the first cross member lower 24 and each having a predetermined height, and a pair of stiffeners 24G provided on either end of the first cross member lower 24 and each having a pair of collar members 24F welded thereto, each collar member 24F having the substantially same height as the bracket members 24E and being cylindrical in shape so that a mounting bolt can be passed therethrough. The upper member 24C, the pair of bracket members 24E and the pair of stiffeners 24G are attached to the top side of the lower member 24A, with the collar members 24F being accommodated in the bracket members 24E.

The lower member 24A and the upper member 24C, which are attached to each other, form a cross member main body 25 which has a closed cross section, extends horizontally in the lateral direction between the two bracket members 24E, and is attached to the lower end of each of the bracket members 24E. Each bracket member 24E is attached to the corresponding bent piece 24D and stiffener 24G to form a hollow three-dimensional shape defining a closed space, in which the collar members 24F are accommodated. The bracket members 24E determine the vertical distance from the undersides of the floor frames 14 to the first cross member lower 24 disposed below the floor frames 14.

To ensure that the first cross member lower 24 has adequate strength and rigidity so as not to be deformed easily by a side impact load, the lower member 24A, the upper member 24C, the bracket members 24E, and the stiffeners 24G excluding the collar members 24F are all made of a high tensile steel sheet. Further, each bracket member 24E forms a hollow box-like shape jointly with the corresponding bent piece 24D, and moreover, the collar members 24F each having a substantially same height as the bracket member 24E are disposed within the bracket member 24E, and thus, the strength and rigidity of each bracket member 24E are improved, particularly in the vertical direction (up and down direction).

As shown in FIGS. 8, 9, 11 and 12, a nut support member 26 is disposed within the groove defined by each floor frame 14 and is attached to the floor frame 14 at the same position as the first cross member lower 24 in the fore-and-aft direction. Each nut support member 26 has a groove-like shape having an upper surface portion 26A extending in parallel with a groove bottom 14A of the corresponding floor frame 14, and is provided with welding margins 26B formed by bending on respective edge portions (on all of the edge portions around the groove opening), such that the welding margins 26B are welded to the bottom surface and the side surfaces of the floor frame 14.

To the upper surface portion 26A of each nut support member 26 are attached upper end portions of a pair of cylindrical collar nut members 28. The collar nut members 28 are provided for fastening the bracket members 24E by means of bolts. Each collar nut member 28 extends through a corresponding one of through-holes 26C formed in the upper surface portion 26A of the nut support member 26 (see FIGS. 9 and 12), is fixed to the upper surface portion 26A, and extends downward from the upper surface portion 26A into an interior of the nut support member 26 to such an extent that the lower end of the collar nut member 28 abuts the groove bottom of the floor frame 14. In this arrangement, the collar nut members 28 are sandwiched between the nut support member 26 and the groove bottom of the floor frame 14 on each side of the vehicle body, and therefore, are mounted to the floor frame 14 with high mounting strength. In the illustrated embodiment, two collar nut members 28 are provided on each side of the vehicle body in accordance with the number of collar members 24F, and are spaced apart from each other in the fore-and-aft direction of the vehicle body.

Each nut support member 26 serves not only as a mounting support for mounting the collar nut members 28 to the corresponding floor frame 14, but also as a reinforcement member for reinforcing the floor frame 14 against a side impact load.

The lateral end portions of the first cross member lower 24 are removably secured to the undersides of the two floor frames 14, respectively, by means of a plurality of (four in total) mounting bolts 30, each of which is passed through the corresponding collar member 24F from the side of the lower member 24A and is threadably engaged with the corresponding collar nut member 28. As a result, each of the bracket members 24E is fixed to the underside of the corresponding floor frame 14 and extends downward from the same, whereby the cross member main body 25 is supported horizontally at a position spaced downward from the floor frames 14 by the height of the bracket members 24E.

In this mounting structure, a space having a height h (see FIG. 9) is defined between the panel main portion 12A and the upper member 24C of the first cross member lower 24, where the height h corresponds to the sum of the height of the floor frame 14 and the height of the bracket member 24E.

As shown in FIGS. 3 and 4, a pair of first outriggers 32 are provided such that one first outrigger 32 is disposed between the side sill 10 and the floor frame 14 on each side of the vehicle body at the same position as the first cross member upper 22 and the first cross member lower 24 in the fore-and-aft direction. Thus, in this arrangement, all of the first cross member upper 22, the first cross member lower 24, the pair of first outriggers 32 and the pair of nut support members 26 are disposed at the same position in the fore-and-aft direction. Namely, these component parts are arranged on a straight line in the lateral direction of the vehicle body.

Figure 11:
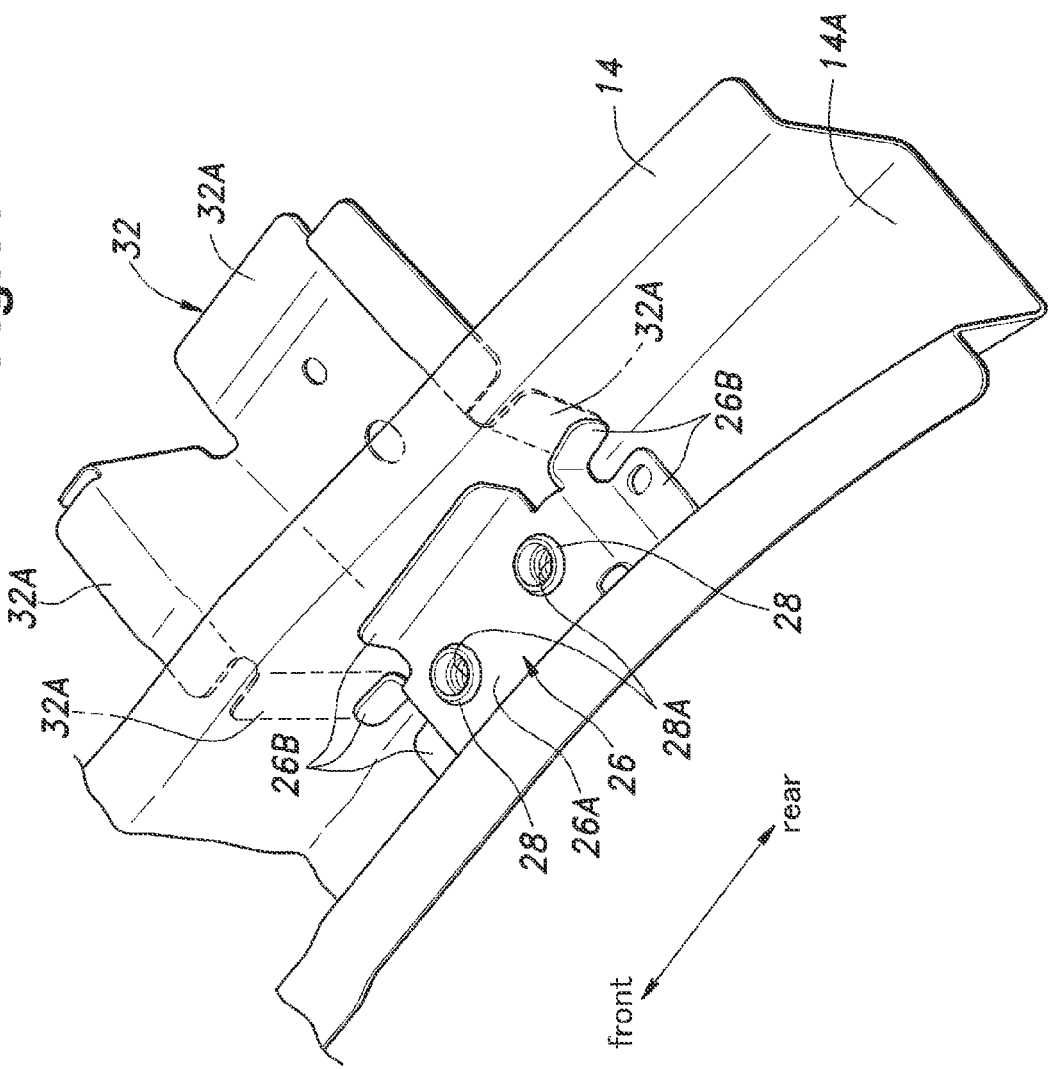
FIG. 11 is an enlarged fragmentary perspective view showing an arrangement of a nut support member and an outrigger in the automotive floor structure according to the embodiment.
Figure 12:
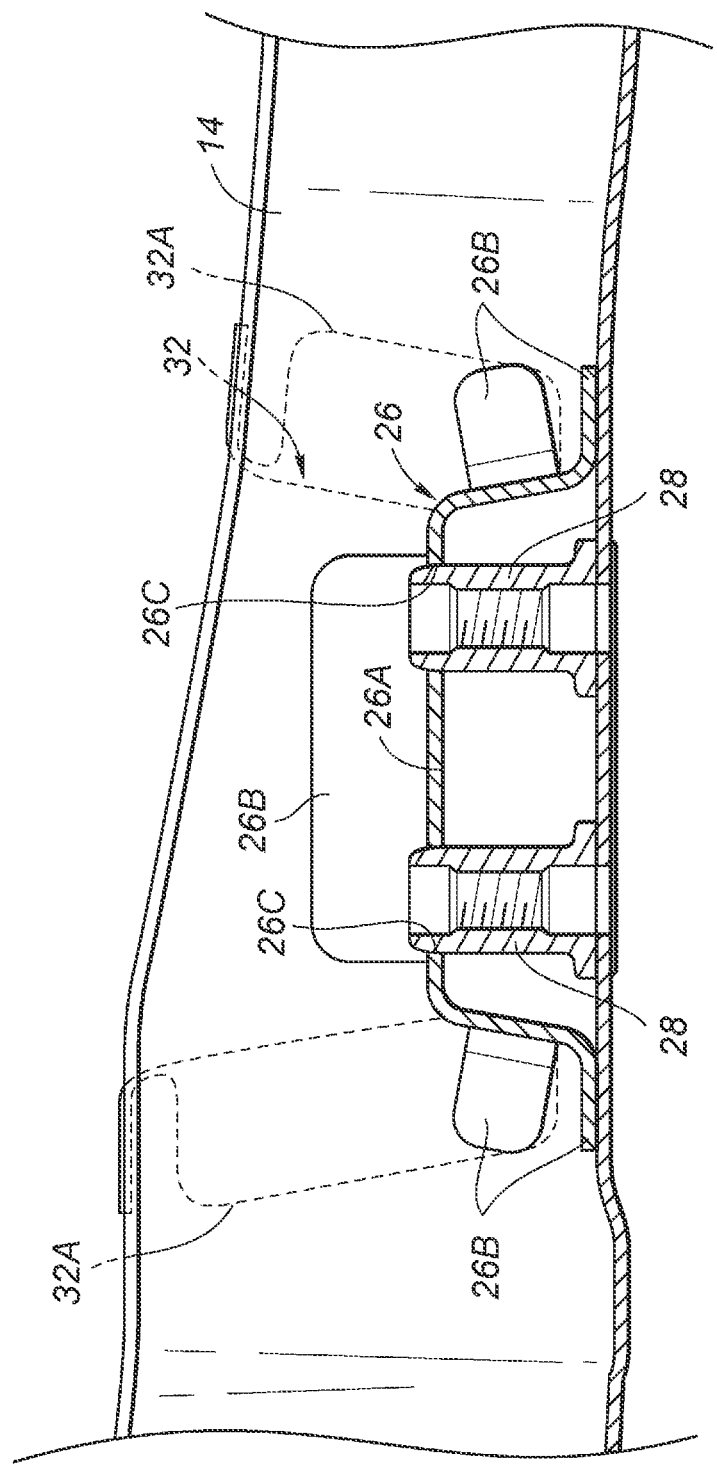
FIG. 12 is an enlarged fragmentary cross-sectional view showing the arrangement of the nut support member and the outrigger in the automotive floor structure according to the embodiment.

As shown in FIGS. 11 and 12, each first outrigger 32 has a groove-like shape and is provided with welding margins 32A formed by bending on respective edge portions (on all of the edge portions around the groove opening), such that the welding margins 32A are welded to the under surface of the front floor panel 12 and the side surfaces of the inner member 10A of the corresponding side sill 10 and the corresponding floor frame 14, whereby each first outrigger 32 forms a box-like shape jointly with the front floor panel 12 and connects the corresponding side sill 10 and floor frame 14 with each other in the lateral direction. As shown in FIGS. 8 and 9, a portion of each first outrigger 32 attached to the corresponding inner member 10A coincides with the height of the side wall of the inner member 10A, and a portion of each first outrigger 32 attached to the corresponding floor frame 14 coincides with the height of the side wall of the floor frame 14.

The first outriggers 32 are configured to have lower strength and rigidity and to deform more easily as compared to the side sills 10 and the floor frames 14. The first outriggers 32 are made of a normal steel sheet having a relatively small thickness, for example, and serve as impact energy absorption members (crushable members) which will collapse (undergo plastic deformation) when subjected to a side impact load.

As shown in FIGS. 2 to 4, a second cross member 34 is provided below the front floor panel 12 at a position spaced rearward from the first cross member lower 24. The second cross member 34 is made of a high tensile steel sheet and has a hat-shaped cross section. The second cross member 34 extends straight in the lateral direction of the vehicle body without including a stepped portion, and is attached to the under surface of the front floor panel 12 to form a closed cross section jointly with the front floor panel 12. Further, each lateral end of the second cross member 34 is attached to the corresponding floor frames 14 without creating a step therebetween.

Figure 13:
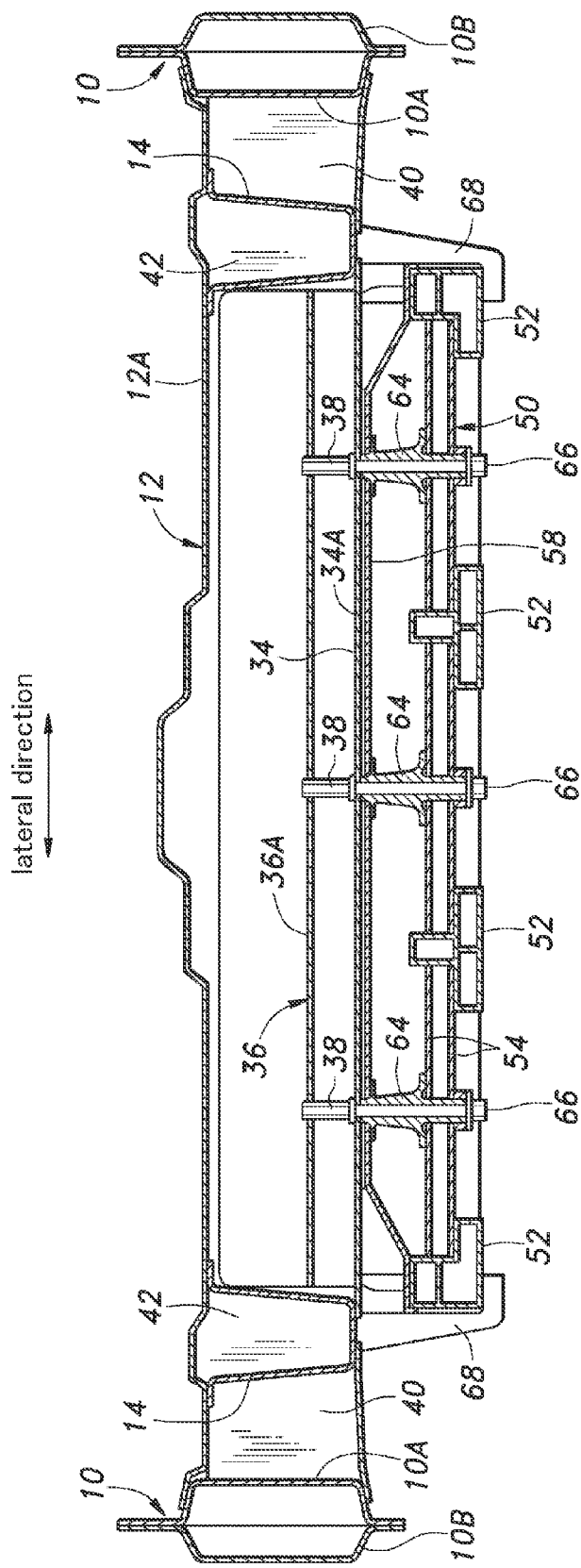
FIG. 13 is a cross-sectional view taken along line XIII-XIII in FIG. 2.
Figure 14:
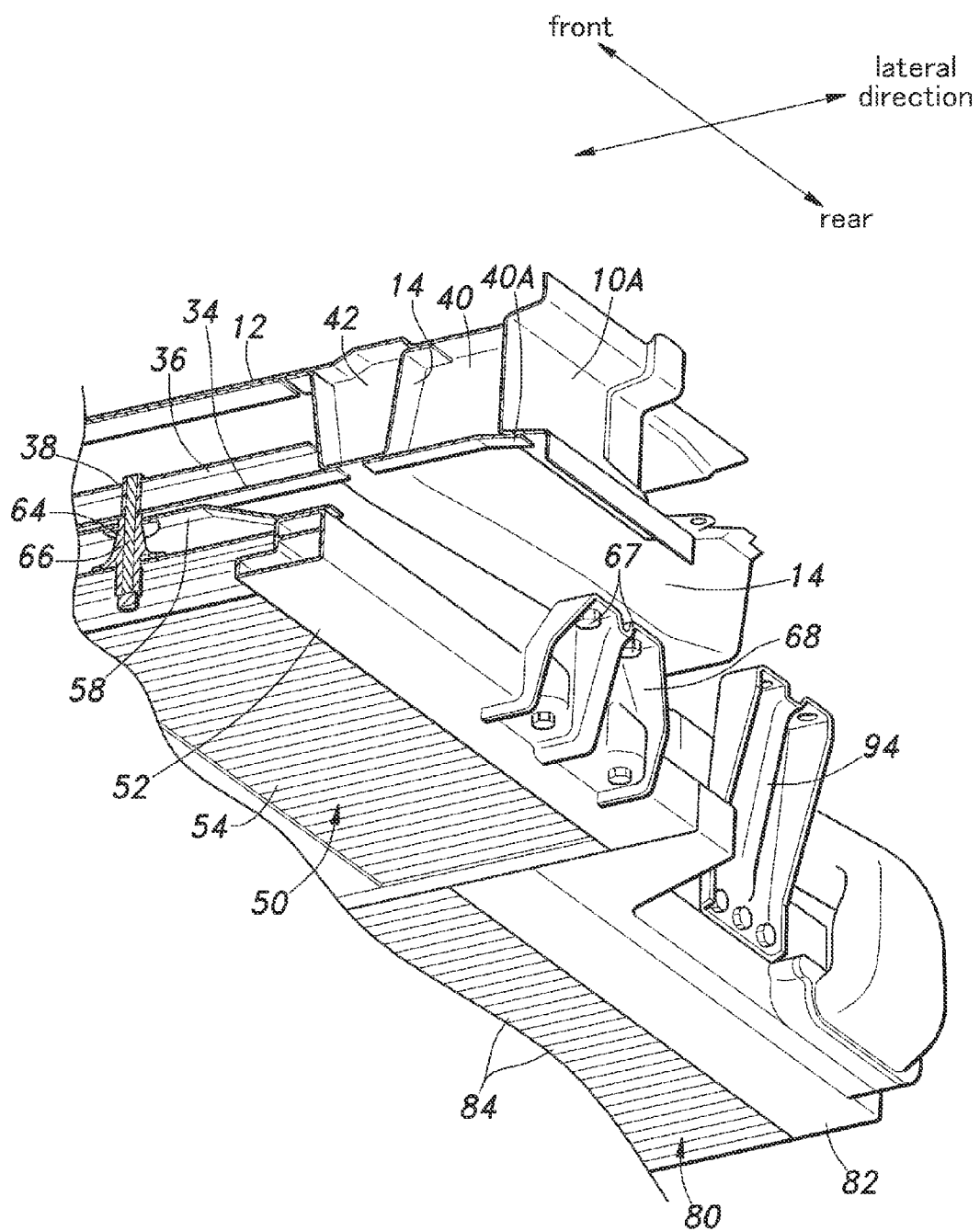
FIG. 14 is an enlarged fragmentary perspective view showing a part of the automotive floor structure according to the embodiment including a second cross member as viewed from the underside.

The expression "without creating a step" used here means that, as shown in FIGS. 4, 13 and 14, the vertical dimension of each floor frame 14 from the under surface of the front floor panel 12 is equal to the vertical dimension of the second cross member 34 from the under surface of the front floor panel 12. Further, the expression "the second cross member extends straight without including a stepped portion" means that, as shown in FIG. 13, the second cross member 34 extends straight in the lateral direction of the vehicle body along a flat surface (horizontal surface) of the panel main portion 12A.

As shown in FIGS. 13 and 14, a nut support member 36 extending over the entire length of the second cross member 34 and having a groove-shaped cross section is attached to an inner side of the groove-shaped cross-sectional portion of the second cross member 34. The nut support member 36 has an upper surface portion 36A spaced apart upward from a groove bottom 34A of the second cross member 34 and extending in parallel with the groove bottom 34A. Collar nut members 38 each extending between the groove bottom 34A of the second cross member 34 and the upper surface portion 36A of the nut support member 36 are attached (fixed) to the upper surface portion 36A of the nut support member 36. The collar nut members 38 are spaced apart from one another at predetermined intervals in the lateral direction of the vehicle body.

The nut support member 36 not only supports the collar nut members 38, but also serves as a reinforcement member for the second cross member 34. It is to be noted that, in order for the nut support member 36 to act as an effective reinforcement member, it is preferred that the upper surface portion 36A of the nut support member 36 be provided at the same height as a middle part of the side sill 10 as seen in the cross section thereof or a part adjacent to the middle part.

As shown in FIGS. 2 to 4 and 14, a pair of second outriggers 40 are provided such that one second outrigger 40 is disposed between the side sill 10 and the floor frame 14 on each side of the vehicle body at the same position as the second cross member 34 in the fore-and-aft direction. Namely, the second cross member 34 and the pair of second outriggers 40 are arranged on a straight line in the lateral direction.

Each second outrigger 40 has a groove-like shape and is provided with welding margins 40A formed by bending on respective edge portions (on all of the edge portions around the groove opening), such that the welding margins 40A are welded to the under surface of the front floor panel 12 and the side walls of the inner member 10A of the corresponding side sill 10 and the corresponding floor frame 14, whereby each second outrigger 40 forms a box-like shape jointly with the front floor panel 12. As shown in FIGS. 13 and 14, similarly to the first outriggers 32, a portion of each second outrigger 40 attached to the corresponding inner member 10A coincides with the height of the side wall of the inner member 10A, and a portion of each second outrigger 40 attached to the corresponding floor frame 14 coincides with the height of the side wall of the floor frame 14.

Similarly to the aforementioned first outriggers 32, the second outriggers 40 are configured to have lower strength and rigidity and to deform more easily as compared to the side sills 10 and the floor frames 14. The second outriggers 40 may be made of a normal steel sheet having a relatively small thickness, for example, and serve as impact energy absorption members (crushable members) which will collapse (undergo plastic deformation) when subjected to a side impact load.

As shown in FIGS. 4 and 14, a pair of plate-shaped bulkhead members 42 are attached to an inner side of each of the floor frames 14 at the same position as the second cross member 34 in the fore-and-aft direction, more precisely, at the same positions as front and back walls 40B of the corresponding second outrigger 40 in the fore-and-aft direction, respectively. Each bulkhead member 42 is a substantially rectangular plate-shaped member, and extends in a direction intersecting the groove-shaped cross-sectional portion of the corresponding floor frame 14 so as to fill the groove-shaped cross section of the floor frame 14, thereby partitioning the groove-shaped cross-sectional portion into a front part and a rear part. The edge portions of each bulkhead member 42 are attached to the inner side surfaces and the bottom surface of the corresponding floor frame 14 and to the under surface of the floor panel 12. The bulkhead members 42 thus arranged serve as reinforcement members for reinforcing the floor frames 14 against a side impact load.

As shown in FIGS. 3 and 8, a battery unit 50 is fixedly disposed between the two floor frames 14 below the front floor panel 12. The battery unit 50 is formed by longitudinal frames 52 extending in parallel with one another in the fore-and-aft direction, lateral frames 54 tightly arranged in the fore-and-aft direction and each extending in the lateral direction and having ends attached to adjoining longitudinal frames 52, battery main bodies 56 mounted on the lateral frames 54, and an upper cover member 58 secured to an upper part of the longitudinal members 52 to define a space in which the battery main bodies 56 are accommodated. A structure formed by attaching together the longitudinal frames 52 and the lateral frames 54 to one another is referred to herein as a battery frame. The battery frame extends over a flat rectangular bottom of the battery unit 50.

Each of the longitudinal frames 52 and the lateral frames 54 may include a hollow rod member formed by extrusion molding of aluminum to reduce the weight thereof, and these frames may be attached to one another by MIG welding or the like.

As shown in FIGS. 8 and 9, a frontal part of the battery unit 50 is disposed in the space having the height h defined between the first cross member lower 24 and the front floor panel 12, and is removably secured to the first cross member lower 24 by means of bolts 62 which are passed through the first cross member lower 24 from the side of the lower member 24A and threadably engaged with corresponding nut members 60 fixed to the longitudinal frames 52. In this arrangement, the first cross member upper 22 and the first cross member lower 24 vertically interpose the battery unit 50 therebetween and connect the floor frames 14 to each other in the lateral direction of the vehicle body.

As shown in FIGS. 3, 13 and 14, an intermediate part of the battery unit 50 in the fore-and-aft direction is removably secured to the second cross member 34 by means of mounting bolts 66 which are passed through related lateral frames 54 and collar members 64 provided between the lateral frames 54 and the upper cover member 58, and are threadably engaged with the corresponding nut members 38. The collar member 64 are attached (secured) to the battery frame, specifically to the lateral frames 54 in the illustrated embodiment, and each have one end (upper end) abutting the under surface of the second cross member 34. The mounting bolts 66 are passed through the corresponding collar members 64 and are threadably engaged with the corresponding nut members 38 supported by the nut support member 36, and thus, robust screw fastening is achieved. As a result, the battery unit 50 can be suspendedly supported by the second cross member 34 with improved strength and reliability.

Figure 7:
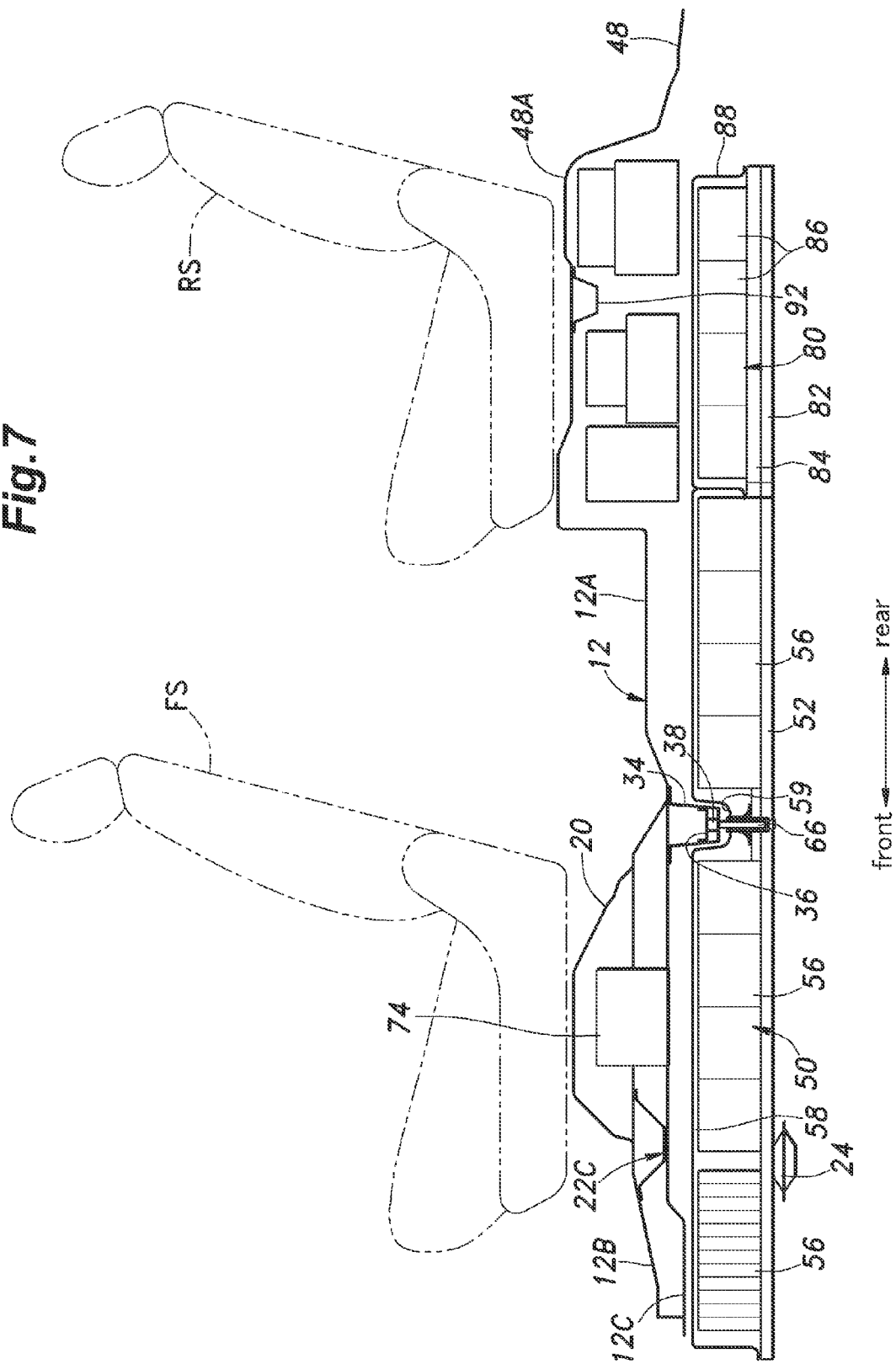
FIG. 7 is a central cross-sectional view of the automotive floor structure according to the embodiment.

It is to be noted that, as shown in FIG. 7, the upper cover member 58 of the battery unit 50 includes a recessed groove 59 extending in the lateral direction of the vehicle body at a part corresponding to the second cross member 34, and the collar members 64 are arranged along the recessed groove 59. The second cross member 34 extends in the recessed groove 59, and interference between the battery unit 50 and the second cross member 34 is avoided.

As is described in the foregoing, since the battery unit 50 is supported by the first cross member lower 24 and the second cross member 34 at positions spaced apart from each other in the fore-and-aft direction, the battery unit 50 can be mounted to the vehicle body steadily and reliably.

Figure 15:
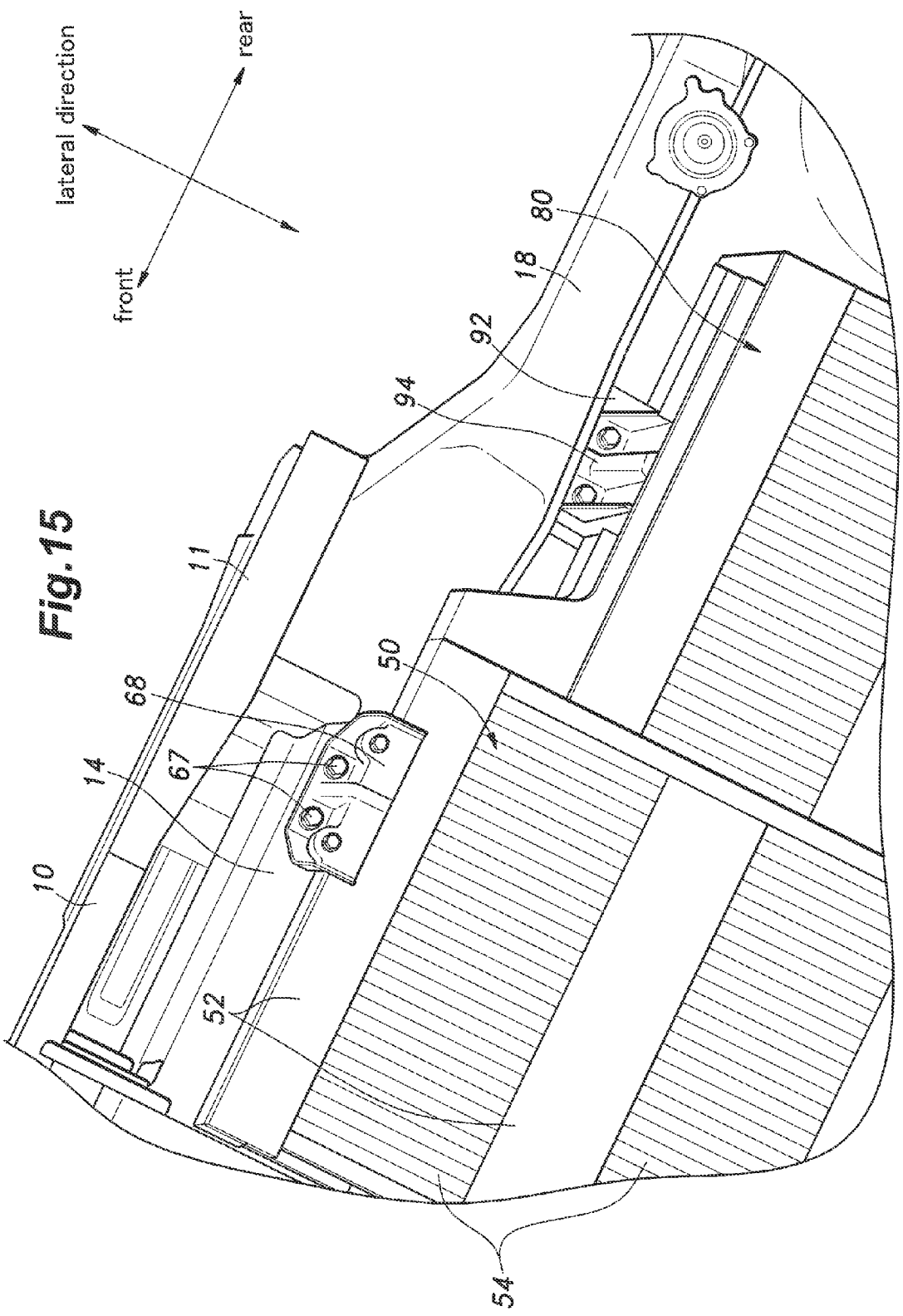
FIG. 15 is an enlarged fragmentary perspective view showing a rear portion of the automotive floor structure according to the embodiment as viewed from the underside.

Further, as shown in FIGS. 3, 14 and 15, a rear end part of each of the outer longitudinal frames 52 of the battery unit 50 is fastened to a bracket 68 by means of bolts, where the bracket 68 is removably secured to the corresponding floor frame 14 by means of bolts 67. Thus, the lateral side portions of the rear end part of the battery unit 50 are supported by the floor frames 14, respectively, via the brackets 68.

As shown in FIGS. 3 and 7, in the illustrated embodiment, another battery unit 80 is disposed between the pair of rear side frames 18 on a rear side of the battery unit 50. Similarly to the battery unit 50, the battery unit 80 is formed by longitudinal frames 82 extending in parallel with one another in the fore-and-aft direction, lateral frames 84 tightly arranged in the fore-and-aft direction and each extending in the lateral direction and having ends attached to adjoining longitudinal frames 82, battery main bodies 86 mounted on the lateral frames 84, and an upper cover member 88 secured to an upper part of the longitudinal members 82 to define a space in which the battery main bodies 86 are accommodated. An outer frame 90 is fastened to each of the outermost longitudinal frames 82.

Each of the longitudinal frames 82 and the lateral frames 84 also may include a hollow rod member formed by extrusion molding of aluminum to reduce the weight thereof, and these frames also may be attached to one another by MIG welding or the like.

As shown in FIG. 3, a rear cross member 92 is provided between the rear side frames 18 such that the rear cross member 92 extends in the lateral direction of the vehicle body and has lateral ends attached to the rear side frames 18, respectively. A bracket 94 is mounted to each of the lateral ends of the rear cross member 92. As shown in FIGS. 14 and 15, the brackets 94 are fastened to the corresponding outer frames 90 by means of bolts, and removably support the battery unit 80.

As shown in FIG. 7, a battery control unit 74 is disposed in a space inside the upper tunnel member 20. A front seat FS is provided above the upper tunnel member 20. A rear floor panel 48 is connected to the rear end of the front floor panel 12, and a rear seat RS is provided above an elevated portion 48A of the rear floor panel 48.

In the structure described in the foregoing, the side sill 10 and the floor frame 14 on each side of the vehicle body are connected to each other by the corresponding outriggers 32, 40 and either the right end member 22A or the left end member 22E, which are easier to deform than the floor frame 14, and therefore, at the time of a side collision, the right end member 22A or the left end member 22E, the first outrigger 32 and the second outrigger 40 are caused to collapse by a side impact load, such that side impact energy is absorbed between the side sill 10 and the floor frame 14. Therefore, the floor frames 14 are prevented from being deformed at the time of a side collision, and the battery unit 50 disposed between the floor frames 14 can be protected.

Since the portion of each first outrigger 32 attached to the corresponding inner member 10A coincides with the height of the side wall of the inner member 10A, and the portion of each first outrigger 32 attached to the corresponding floor frame 14 coincides with the height of the side wall of the floor frame 14, each first outrigger 32 can receive a side collision load over its entire height as a compressive load. Namely, each first outrigger 32 is configured to receive a side collision load from the entire vertical expanse of the side wall of the corresponding side sill 10 while the other side of the first outrigger 32 is supported by the side wall of the corresponding floor frame 14 over the entire vertical expanse thereof, and therefore, the entire part of the first outrigger 32 can effectively collapse. This increases an amount of impact energy that can be absorbed by each first outrigger 32 between the corresponding side sill 10 and floor frame 14. As a result, deformation of the floor frames 14 can be prevented effectively.

Likewise, since the portion of each second outrigger 40 attached to the corresponding inner member 10A coincides with the height of the side wall of the inner member 10A, and the portion of each second outrigger 40 attached to the corresponding floor frame 14 coincides with the height of the side wall of the floor frame 14, each second outrigger 40 can receive a side collision load over its entire height as a compressive load. Namely, each second outrigger 40 also is configured to receive a side collision load from the entire vertical expanse of the side wall of the corresponding side sill 10 while the other side of the second outrigger 40 is supported by the side wall of the corresponding floor frame 14 over the entire vertical expanse thereof, and therefore, the entire part of the second outrigger 40 can effectively collapse. This increases an amount of impact energy that can be absorbed by each second outrigger 40 between the corresponding side sill 10 and floor frame 14. This also contributes to preventing deformation of the floor frames 14 effectively.

It is to be noted that impact energy absorbing zones where collapsing of the right end member 22A or the left end member 22E, the first outrigger 32 and the second outrigger 40 may take place are indicated by reference sign E in FIG. 8.

The first cross member upper 22 and the first cross member lower 24 vertically sandwich the battery unit 50 therebetween and connect the floor frames 14 to each other in the lateral direction of the vehicle body. Therefore, a side impact load that is input to one floor frame 14 after the right end member 22A or the left end member 22E, the first outrigger 32 and the second outrigger 40 have collapsed is split into a part conveyed by the first cross member upper 22 and a part conveyed by the first cross member lower 24, and via these cross members, transmitted from the one floor frame 14 to the other floor frame 14.

Thus, the burden of load transmission on each of the first cross member upper 22 and the first cross member lower 24 is reduced, and the transmission of load in the lateral direction, namely, the transmission of load from one floor frame 14 to the other, is performed efficiently and favorably. As a result, deformation of the floor frame 14 on the side receiving a side impact load can be prevented reliably and effectively, and the impact load can be reliably prevented from acting upon the battery unit 50 disposed between the floor frames 14. Consequently, the battery unit 50 can be protected against a side collision reliably. In other words, damage to the battery unit 50 caused by a side collision can be avoided reliably.

Further, owing to the first cross member lower 24 disposed below the floor, the first cross member upper 22 disposed in the vehicle cabin can be made smaller in size as compared to a conventional one, and this enables a smaller vehicle body with a larger interior space for passengers.

The right end member 22A and the left end member 22E of the first cross member upper 22 are provided with lower strength than that of the first cross member lower 24, and act as members for absorbing impact energy by collapsing upon receipt of a side impact load, and therefore, by adjusting the strength of theses end members, it is possible to set a ratio between the side impact load input to the first cross member upper 22 and the side impact load input to the first cross member lower 24 at an optimum value.

The first cross member lower 24 is capable of transmitting a relatively large side impact load owing to the following features: the main body of the first cross member lower 24 has a closed cross section and has high rigidity; the collar members 24F improve the rigidity of the bracket members 24E; and the upper part of each of the collar nut members 28 for securing the bracket members 24E by means of bolts is fixed to the associated nut support member 26 which in turn is attached to the corresponding floor frame 14, so that the collar nut members 28 are mounted to the floor frame 14 with improved mounting strength. Namely, the first cross member lower 24 is robust in its entirety and is hard to be deformed by a side impact load, and these features enable the first cross member lower 24 to transmit a larger side impact load, and the amount of side impact load allowed to be input to the first cross member lower 24 can be increased.

Since the first cross member upper 22, the first cross member lower 24 and the pair of outriggers 32 are disposed at the same position in the fore-and-aft direction of the vehicle body, transmission of a side impact load from the side sill 10 to the floor frame 14 via the first outrigger 32 and to each of the first cross member upper 22 and the first cross member lower 24 is performed linearly in a favorable manner. This also contributes to prevention of deformation of the floor frames 14.

Further, since the second cross member 34 extends straight in the lateral direction without including a stepped portion, and has lateral ends attached to the two floor frames 14, respectively, without a step created therebetween, transmission of a side impact load between the floor frames 14 via the second cross member 34 can be performed favorably without a bending moment created in the second cross member 34. As a result, deformation of the floor frame 14 on the side receiving a side impact load can be prevented reliably and effectively. Thus, the impact load can be prevented from acting upon the battery unit 50 disposed between the floor frames 14, and the battery unit 50 can be protected against a side collision reliably.

Furthermore, since the nut support member 36 not only supports the collar nut members 38, but also serves as a reinforcement member for the second cross member 34, the second cross member 34 can have a reduced cross section while maintaining sufficient strength and rigidity to protect the battery unit 50. This enables a compact vehicle body design with a reduced weight. Further, since the supporting strength of the collar nut members 38 is increased, the supporting strength of the battery 50 also is increased.

In addition, since the upper surface portion 36A of the nut support member 36 is located at the same height as a middle part of the side sill 10 as seen in the cross section thereof or a part adjacent to the middle part, the second cross member 34 can receive a side impact load without causing tilting of the side sill 10, and transmission of the side impact load by the second cross member 34 can be performed efficiently and favorably.

Since the second cross member 34 and the pair of second outriggers 40 are disposed at the same position in the fore-and-aft direction, transmission of a side impact load from the side sill 10 to the floor frame 14 via the second outrigger 40 and to the second cross member 34 also is performed linearly in a favorable manner. This also contributes to prevention of deformation of the floor frames 14.

Further, owing to the provision of the bulkhead members 42, the strength and rigidity of a part of each floor frame 14 to which the second cross member 34 is attached are improved effectively, and this allows a side impact load to be transmitted to the entire cross section of the second cross member 34 in a favorable manner.

Owing to the foregoing features, deformation of the floor frames 14 can be avoided effectively at the time of a side collision, and thus, a side impact load is prevented from acting on the battery unit 50 disposed between the floor frames 14 and the battery unit 50 can be protected against a side collision reliably.

The battery unit 50 can be removed together with the first cross member lower 24 from under the front floor panel 12 for replacement by first detaching the first cross member lower 24 from the floor frames 14 by removing the mounting bolts 30, removing the mounting bolts 66, and then, detaching the brackets 68 from the floor frames 14 by removing the bolts 67.

Thus, mounting/removal of the battery unit 50 for replacement can be readily achieved from under the vehicle floor, while the battery unit 50 can be protected reliably at the time of a side collision, as described in the foregoing.

The front floor panel 12 includes the pair of recessed portions 12C which are provided on left and right sides of the tunnel portion 12B, respectively, in front of the first cross member upper 22 and are depressed downward relative to the panel main portion 12A, and the battery unit 50 is disposed on a rear side of the pair of recessed portions 12C. Thus, even though the battery unit 50 is disposed below the vehicle floor, the recessed portions 12C can be provided. The recessed portions 12C each provide a foot resting space for a passenger in the front seat FS, thereby allowing the passenger to sit comfortably in the front seat FS while keeping the front seat FS from being disposed at an inconveniently high position which would sacrifice the easiness in getting in and out of the vehicle.

Further, even though the battery unit 50 is mounted below the vehicle floor, the panel main portion 12A, which is substantially flat and under which the second cross member 34 is disposed, is provided in front of the rear seat RS, and therefore, a good foot resting space for passengers sitting in the rear seat RS can be provided. Thus, in this arrangement, the passengers are allowed to sit comfortably while a side impact load can be transmitted linearly and efficiently by the second cross member 34.

Although the present invention has been described in terms of preferred embodiments thereof, it is obvious to a person skilled in the art that the present invention is not limited by the foregoing embodiments, and various alterations and modifications are possible without departing from the scope of the present invention. Further, not all of the component parts shown in the foregoing embodiments are necessarily indispensable and they may be selectively used within the scope of the present invention.

For instance, the bracket members 24E of the first cross member lower 24 are not indispensable, and if the height h is reduced to conform to a battery unit 50 having a smaller thickness, the first cross member lower 24 may be formed by an assembly of the lower member 24A and the upper member 24C or only by the cross member main body 25.

The contents of the original Japanese patent applications (Japanese patent application Nos. 2010-252065, 2010-252070 and 2010-252071, all of which having a filing date of Nov. 10, 2010) on which the Paris Convention priority claim is made for the present application, as well as the contents of any prior art references mentioned in the disclosure of the present application, are incorporated herein in their entirety by reference.

GLOSSARY 10 side sill
10A inner member
10B outer member
11 side sill extension member
12 front floor panel
12A panel main portion
12B tunnel portion
12C recessed portion
12D sloped portion
12F sloped side surface
14 floor frame
16 front side frame
18 rear side frame
20 upper tunnel member
22 upper first cross member
22A right end member
22B right side member
22C in-tunnel center member
22D left side member
22E left end member
24 first cross member lower
24A lower member
24C upper member
24E bracket member
24F collar member
25 cross member main body
26 nut support member
28 collar nut member
30 bolt
32 first outrigger
34 second cross member
36 nut support member
38 collar nut member
48 rear floor panel
40 second outrigger
42 bulkhead member
50 battery unit
68 bracket
80 battery unit
92 rear cross member

The invention claimed is:

1. An automotive floor structure, comprising:
a pair of side sills extending in a fore-and-aft direction on either side of a vehicle body;
a front floor panel extending between the two side sills; and
a pair of floor frames extending in the fore-and-aft direction below the front floor panel at positions spaced inward from the two side sills, respectively, in a lateral direction of the vehicle body, such that a battery unit is disposed between the two floor frames below the front floor panel, the automotive floor structure further comprising:
a first cross member upper extending in the lateral direction and having ends attached to the two side sills, respectively; and
a first cross member lower extending in the lateral direction below the front floor panel at a position under the first cross member upper, and having ends secured to the two floor frames, respectively, wherein the first cross member upper and the first cross member lower vertically sandwich the battery unit therebetween,
wherein a portion of the first cross member upper extending between the side sill and the floor frame on each side of the vehicle body has a strength lower than that of a portion of the first cross member upper extending between the floor frames in the lateral direction.

2. The automotive floor structure according to claim 1, wherein the first cross member upper and the first cross member lower are disposed at a same position in the fore-and-aft direction, and the automotive floor structure further comprises a first outrigger disposed between the side sill and the floor frame on each side of the vehicle body at a same position as the first cross member upper and the first cross member lower in the fore-and-aft direction, each first outrigger being attached to the corresponding side sill and floor frame and configured to collapse upon receipt of side impact energy.

3. The automotive floor structure according to claim 2, wherein a portion of each first outrigger attached to the corresponding side sill coincides with a height of a side wall of the side sill, and a portion of each first outrigger attached to the corresponding floor frame coincides with a height of a side wall of the floor frame.

4. The automotive floor structure according to claim 1, wherein the first cross member lower is removably secured to the floor frames, and the battery unit is secured to the first cross member lower.

5. The automotive floor structure according to claim 1, further comprising:
a second cross member extending in the lateral direction below the front floor panel at a position spaced rearward from the first cross member lower, having ends attached to the two floor frames, respectively, and having a shape including a groove-shaped cross-sectional portion;
a nut support member extending over an entire length of the second cross member and attached to an inner side of the groove-shaped cross-sectional portion, the nut support member having an upper surface portion spaced apart upward from a groove bottom of the second cross member by a predetermined distance and extending in parallel with the groove bottom; and
a plurality of collar nut members each extending between the groove bottom of the second cross member and the upper surface portion of the nut support member, the collar nut members being spaced apart from one another at predetermined intervals in the lateral direction and fixed to the upper surface portion of the nut support member,
wherein the battery unit is secured below the front floor panel by means of mounting bolts threadably engaged with the collar nut members.

6. The automotive floor structure according to claim 5, wherein the second cross member extends straight without including a stepped portion between the floor frames.

7. The automotive floor structure according to claim 5, wherein the upper surface portion of the nut support member is positioned at a same height as one of: a middle part of the side sill as seen in a cross section thereof; and a part adjacent to the middle part.

8. The automotive floor structure according to claim 5, wherein a second outrigger is disposed between the side sill and the floor frame on each side of the vehicle body at a same position as the second cross member in the fore-and-aft direction, each second outrigger being attached to the corresponding side sill and floor frame and configured to collapse upon receipt of side impact energy.

9. The automotive floor structure according to claim 8, wherein a portion of each second outrigger attached to the corresponding side sill coincides with a height of a side wall of the side sill, and a portion of each second outrigger attached to the corresponding floor frame coincides with a height of a side wall of the floor frame.

10. The automotive floor structure according to claim 5, wherein each floor frame includes a groove-shaped cross section and a plate-shaped bulkhead member is attached to an inner side of each floor frame at a same position as the second cross member in the fore-and-aft direction, the bulkhead member extending so as to fill the groove-shaped cross section of the floor frame.

11. The automotive floor structure according to claim 5, wherein the battery unit comprises a battery frame at a bottom thereof, and collar members through which the mounting bolts are passed are attached to the battery frame, each collar member having an end abutting the second cross member.

12. The automotive floor structure according to claim 1, wherein the front floor panel comprises:
a panel main portion;
a tunnel portion that is elevated from the panel main portion and extends in the fore-and-aft direction at a central portion in the lateral direction; and
a pair of recessed portions which are provided on left and right sides of the tunnel portion, respectively, in front of the first cross member upper and are depressed downward relative to the panel main portion,
wherein the battery unit is disposed on a rear side of the recessed portions.

13. An automotive floor structure, comprising:
a pair of side sills extending in a fore-and-aft direction on either side of a vehicle body;
a front floor panel extending between the two side sills; and
a pair of floor frames extending in the fore-and-aft direction below the front floor panel at positions spaced inward from the two side sills, respectively, in a lateral direction of the vehicle body, such that a battery unit is disposed between the two floor frames below the front floor panel,
the automotive floor structure further comprising:
a first cross member upper extending in the lateral direction and having ends attached to the two side sills, respectively; and
a first cross member lower extending in the lateral direction below the front floor panel at a position under the first cross member upper, and having ends secured to the two floor frames, respectively, wherein the first cross member upper and the first cross member lower vertically sandwich the battery unit therebetween,
wherein the first cross member lower comprises:
a pair of bracket members fixed to undersides of the two floor frames, respectively, and extending downward from the undersides; and
a cross member main body extending between the two bracket members in the lateral direction and attached to a lower end of each bracket member,
wherein each bracket member is a hollow box member, and a collar member through which a mounting bolt is passed is fixedly disposed inside each bracket member.

14. The automotive floor structure according to claim 13, wherein each floor frame includes a groove-shaped cross section, and a support member is attached to an inner side of the groove, the support member supporting an upper part of a collar nut member for engagement with a bolt to secure the corresponding bracket member to the floor frame.

15. The automotive floor structure according to claim 13, wherein the cross member main body is formed by a lower member and an upper member attached to each other to have a closed cross section.

16. An automotive floor structure, comprising:
   a pair of side sills extending in a fore-and-aft direction on either side of a vehicle body;
   a front floor panel extending between the two side sills; and
   a pair of floor frames extending in the fore-and-aft direction below the front floor panel at positions spaced inward from the two side sills, respectively, in a lateral direction of the vehicle body, such that a battery unit is disposed between the two floor frames below the front floor panel,
   the automotive floor structure further comprising:
      a first cross member upper extending in the lateral direction and having ends attached to the two side sills, respectively; and
      a first cross member lower extending in the lateral direction below the front floor panel at a position under the first cross member upper, and having ends secured to the two floor frames, respectively, wherein the first cross member upper and the first cross member lower vertically sandwich the battery unit therebetween,
   wherein the front floor panel is provided with a pair of sloped portions located over the two floor frames, respectively, on a rear side of the first cross member upper, each sloped portion defining fold ridge lines extending in a direction of extension of the floor frames.

* * * * *